(12) United States Patent
Wada et al.

(10) Patent No.: US 12,534,322 B2
(45) Date of Patent: Jan. 27, 2026

(54) PAPER JAM INDICATION ESTIMATION DEVICE, PAPER JAM INDICATION ESTIMATION METHOD, AND RECORDING MEDIUM

(71) Applicant: Panasonic Intellectual Property Corporation of America, Torrance, CA (US)

(72) Inventors: Madoka Wada, Osaka (JP); Toshiyuki Matsumura, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 51 days.

(21) Appl. No.: 18/380,931

(22) Filed: Oct. 17, 2023

(65) Prior Publication Data

US 2024/0059516 A1     Feb. 22, 2024

Related U.S. Application Data

(63) Continuation of application No. PCT/JP2022/000944, filed on Jan. 13, 2022.

(30) Foreign Application Priority Data

Apr. 28, 2021   (JP) ................................ 2021-075822

(51) Int. Cl.
  *B65H 7/06*      (2006.01)
  *G03G 21/00*    (2006.01)
  (Continued)

(52) U.S. Cl.
  CPC ............... *B65H 7/06* (2013.01); *G03G 21/00* (2013.01); *G06N 3/045* (2023.01); *G06N 3/0464* (2023.01);
  (Continued)

(58) Field of Classification Search
  CPC ......... B65H 7/00–7/20; B65H 2515/82; B65H 2553/30
  See application file for complete search history.

(56) References Cited

U.S. PATENT DOCUMENTS 8,991,820 B2 * 3/2015 Hongo ..................... B65H 5/00
                                                                  271/265.01
12,404,128 B2 * 9/2025 Wada ..................... H04R 1/406
(Continued)

FOREIGN PATENT DOCUMENTS

JP    2018-81465    5/2018
JP    2018-131298   8/2018
(Continued)

OTHER PUBLICATIONS

International Search Report (ISR) issued on Mar. 8, 2022 in International (PCT) Application No. PCT/JP2022/000944.
Office Action issued Nov. 17, 2025 in Chinese Patent Application No. 202280029169.2, with English language translation of Search Report.

*Primary Examiner* — Jeremy R Severson
(74) *Attorney, Agent, or Firm* — Wenderoth, Lind & Ponack, L.L.P.

(57) ABSTRACT

A paper jam indication estimation device estimates an indication that a paper jam will occur in a paper feed device, and includes: a sound collector that collects a friction sound produced between sheets of paper when the paper is fed into the paper feed device from a holder holding a plurality of sheets of the paper; an estimator that, based on an output result obtained by inputting information pertaining to the friction sound into a trained model that is a machine learning model which has been trained, estimates a presence or absence of an indication that a paper jam will occur in the paper feed device; and an outputter that, when the estimator estimates that the indication that a paper jam will occur is (Continued)

present, outputs, to the paper feed device, a signal that stops the paper from being fed into the paper feed device.

12 Claims, 10 Drawing Sheets

(51) Int. Cl.
    *G06N 3/045* (2023.01)
    *G06N 3/0464* (2023.01)
    *G06N 3/09* (2023.01)
    *G06N 3/044* (2023.01)

(52) U.S. Cl.
    CPC .......... *G06N 3/09* (2023.01); *B65H 2511/524* (2013.01); *B65H 2511/528* (2013.01); *B65H 2515/82* (2013.01); *B65H 2553/30* (2013.01); *B65H 2557/63* (2013.01); *B65H 2801/06* (2013.01); *G06N 3/044* (2023.01)

(56) References Cited

U.S. PATENT DOCUMENTS

| | | | |
|---|---|---|---|
| 2020/0230981 A1* | 7/2020 | Gunji | ................ B41J 11/425 |
| 2020/0283252 A1 | 9/2020 | Kiyose et al. | |
| 2020/0307279 A1 | 10/2020 | Yoshida | |
| 2020/0317458 A1 | 10/2020 | Kanada | |

FOREIGN PATENT DOCUMENTS

| | | |
|---|---|---|
| JP | 2019-142607 | 8/2019 |
| JP | 2020-40783 | 3/2020 |
| JP | 2020-142868 | 9/2020 |
| JP | 2020-164321 | 10/2020 |
| JP | 2020-170952 | 10/2020 |
| JP | 2021-048440 | 3/2021 |

\* cited by examiner

FIG. 3
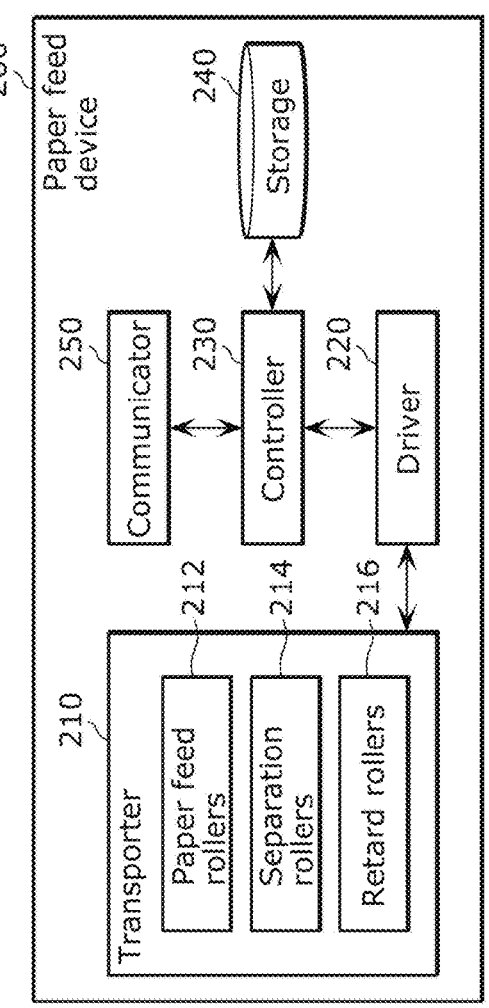
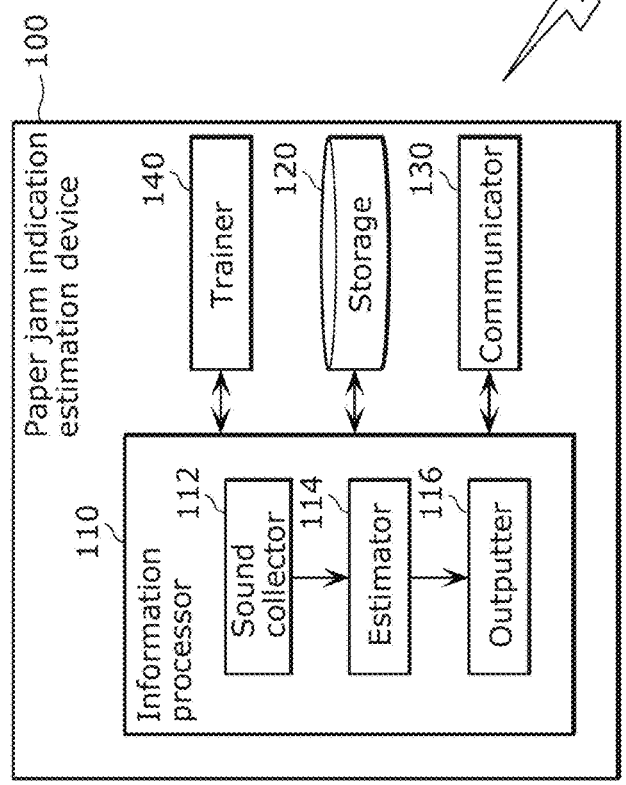

FIG. 7
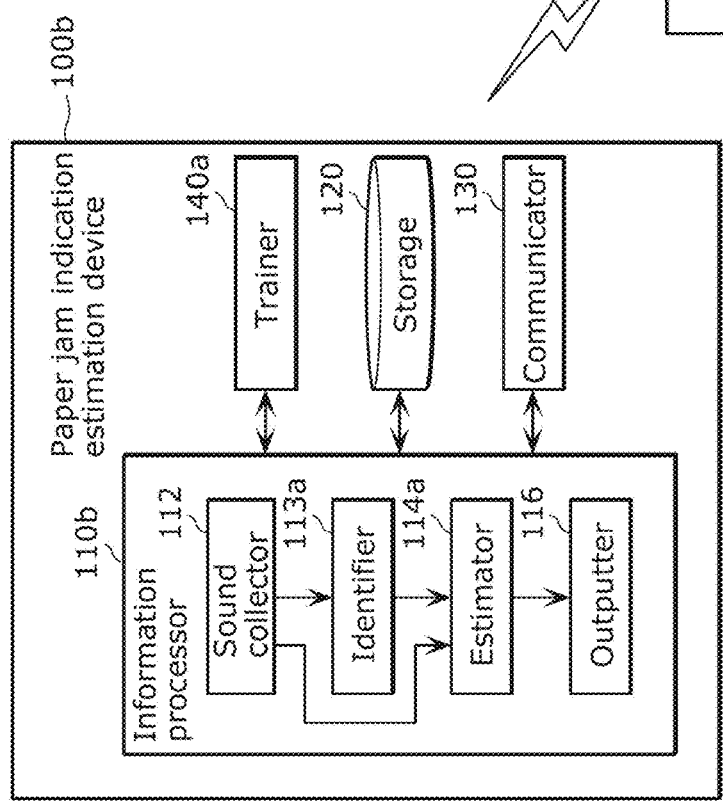
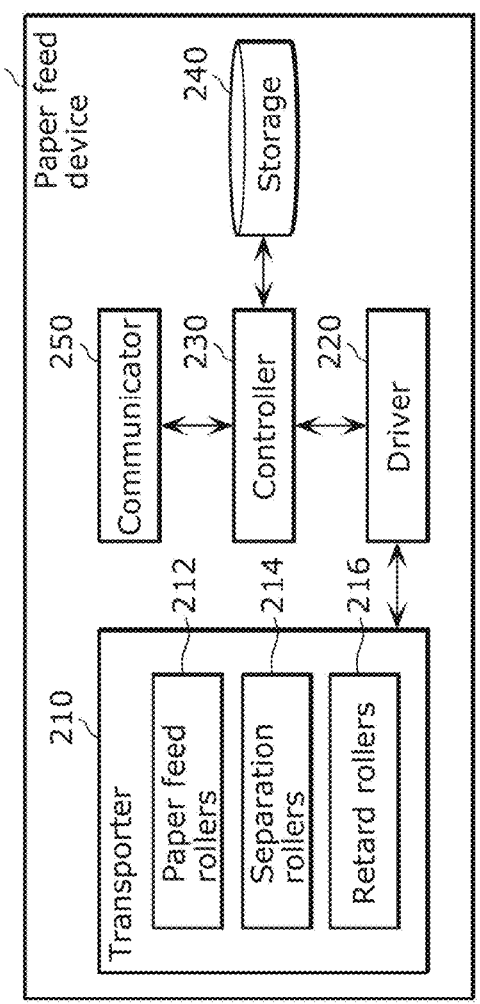

| Name | Basis weight (g/m²) | Thickness (μm) | Estimation accuracy (%) |
|---|---|---|---|
| Fine quality paper 1 | 80 | 91 | 60 |
| Fine quality paper 2 | 80 | 83 | 90 |
| Fine quality paper 3 | 75 | 89 | 100 |
| Fine quality paper (light paper) | 40 | 37 | 60 |
| Glossy coated paper | 64 | 46 | 30 |
| Pressure-sensitive paper base paper | 40 | 42 | 60 |
| Tracing paper | 40 | 35 | 80 |
| Typewriter paper | 25 | 18 | 10 |

| Name | Basis weight (g/m²) | Thickness (μm) | Estimation accuracy (%) |
|---|---|---|---|
| Fine quality paper 1 | 80 | 91 | 80 |
| Fine quality paper (light paper) | 40 | 37 | 70 |
| Tracing paper | 40 | 35 | 100 |
| Typewriter paper | 25 | 18 | 90 |

PAPER JAM INDICATION ESTIMATION DEVICE, PAPER JAM INDICATION ESTIMATION METHOD, AND RECORDING MEDIUM

CROSS REFERENCE TO RELATED APPLICATIONS

This is a continuation application of PCT International Application No. PCT/JP2022/000944 filed on Jan. 13, 2022, designating the United States of America, which is based on and claims priority of Japanese Patent Application No. 2021-075822 filed on Apr. 28, 2021. The entire disclosures of the above-identified applications, including the specifications, drawings and claims are incorporated herein by reference in their entirety.

FIELD

The present disclosure relates to a paper jam indication estimation device, a paper jam indication estimation method, and a recording medium.

BACKGROUND

In paper feed devices that feed paper to image reading devices such as printers or image copying devices (what are known as "scanners"), paper jams may occur due to, for example, feeding multiple sheets of paper together, skewed feeding, staples in the paper, and the like. Depending on the severity of the paper jam, not only will the work be delayed, but the paper itself may be damaged to the point of being unusable. What is needed, therefore, is a technique for the early detection of paper jams.

PTL 1, for example, discloses a technique in which an ultrasonic wave transmitted from an ultrasonic transmitter provided in a part of a medium supporter is received by an ultrasonic receiver provided in another part of the medium supporter, and whether the medium is lifting off a placement surface (called "paper lifting" hereinafter) is determined based on the sound pressure of the received ultrasonic wave.

CITATION LIST

Patent Literature

PTL 1: Japanese Unexamined Patent Application Publication No. 2020-142868

SUMMARY

Technical Problem

However, the technique described in PTL 1 requires an ultrasonic transmitter to determine whether paper lifting has occurred, and it is difficult to say that the presence or absence of an indication that a paper jam will occur (i.e., the occurrence of paper lifting) can be estimated with ease.

The present disclosure provides a paper jam indication estimation device, a paper jam indication estimation method, and a recording medium capable of easily estimating the presence or absence of an indication that a paper jam will occur.

Solution to Problem

A paper jam indication estimation device according to one aspect of the present disclosure is a paper jam indication estimation device that estimates an indication that a paper jam will occur in a paper feed device, and includes: a sound collector that collects a friction sound produced when paper is fed into the paper feed device from a holder holding a plurality of sheets of the paper; an estimator that, based on an output result obtained by inputting information pertaining to the friction sound into a trained model that is a machine learning model which has been trained, estimates a presence or absence of an indication that a paper jam will occur in the paper feed device; and an outputter that, when the estimator estimates that the indication that a paper jam will occur is present, outputs, to the paper feed device, a signal that stops the paper from being fed into the paper feed device.

Advantageous Effects

According to the present disclosure, a paper jam indication estimation device, a paper jam indication estimation method, and a recording medium capable of easily estimating the presence or absence of an indication that a paper jam will occur can be provided.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 3 is a diagram illustrating an example of the configurations of the paper jam indication estimation device and the paper feed device according to Embodiment 1.

FIG. 7 is a diagram illustrating an example of the configurations of a paper jam indication estimation device and a paper feed device according to Embodiment 2.

DESCRIPTION OF EMBODIMENTS

Overview of the Present Disclosure

Figure 1:
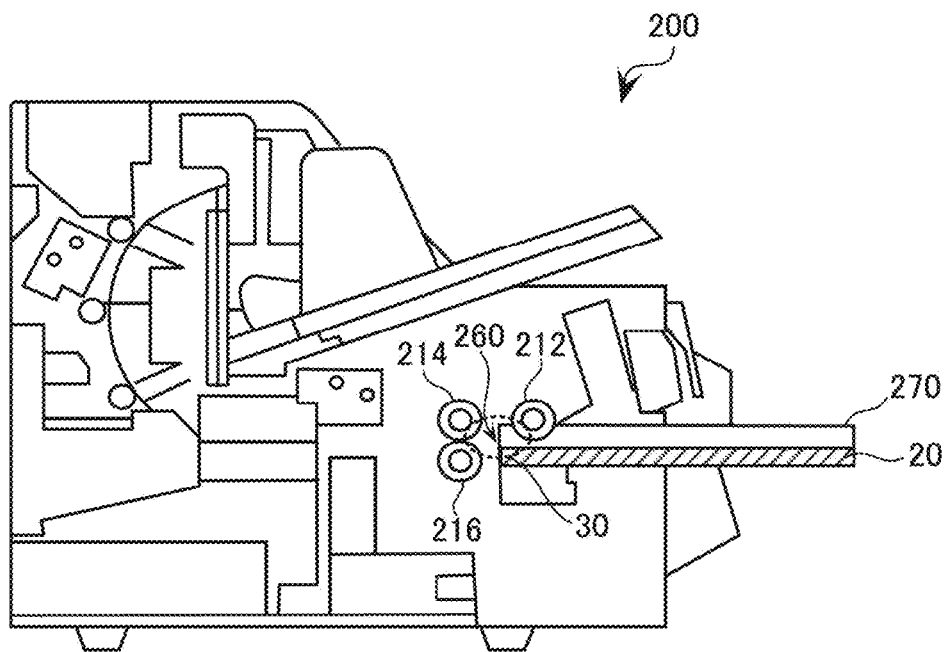
FIG. 1 is a diagram illustrating an example of a paper feed device in which a paper jam indication estimation device according to Embodiment 1 is applied.

A paper jam indication estimation device according to one aspect of the present disclosure is a paper jam indication estimation device that estimates an indication that a paper jam will occur in a paper feed device, and includes: a sound collector that collects a friction sound produced when paper is fed into the paper feed device from a holder holding a plurality of sheets of the paper; an estimator that, based on an output result obtained by inputting information pertaining to the friction sound into a trained model that is a machine learning model which has been trained, estimates a presence or absence of an indication that a paper jam will occur in the paper feed device; and an outputter that, when the estimator estimates that the indication that a paper jam will occur is present, outputs, to the paper feed device, a signal that stops the paper from being fed into the paper feed device.

Through this, the paper jam indication estimation device collects a friction sound when paper is fed into the paper feed device from the holder, and based on an output result obtained by inputting information pertaining to the friction sound collected into a trained model, estimates the presence or absence of an indication that a paper jam will occur, such as lifting of the paper, before the paper jam occurs. Accordingly, it is not necessary to provide an ultrasonic transmitter in order to estimate whether lifting of the paper has occurred, for example, as is the case with the past techniques, and it is sufficient to provide only the sound collector that collects the friction sound. As such, the paper jam indication estimation device can estimate the presence or absence of an indication that a paper jam will occur easily and with a simpler configuration than a configuration including an ultrasonic wave emitter.

Additionally, the paper jam indication estimation device can estimate the presence or absence of an indication that a paper jam will occur, such as lifting of the paper being fed, and can therefore not only prevent paper jams from occurring, but can also suppress damage to the paper.

In the paper jam indication estimation device according to one aspect of the present disclosure, the information pertaining to the friction sound input into the trained model may be an image of a spectrogram of the friction sound or an image of a frequency characteristic of the friction sound.

Through this, the paper jam indication estimation device can more easily extract regularity of the image (i.e., features) by using a machine learning model. Accordingly, the paper jam indication estimation device can more easily estimate the presence or absence of an indication that a paper jam will occur.

In the paper jam indication estimation device according to one aspect of the present disclosure, the friction sound may be an inaudible sound produced by friction between the paper fed from the holder and paper held in the holder. For example, the inaudible sound may be a sound at a frequency in an ultrasonic band.

Through this, the paper jam indication estimation device estimates the presence or absence of lifting in the paper based on an inaudible sound in the friction sound produced when the paper is fed from the holder (e.g., sound at a frequency in an ultrasonic band), and thus is not susceptible to the effects of various audible sounds produced in the periphery of the paper jam indication estimation device, i.e., sounds that are noise, and thus collects sound more accurately. As such, the paper jam indication estimation device can estimate the presence or absence of an indication that a paper jam will occur with good accuracy.

In the paper jam indication estimation device according to one aspect of the present disclosure, supervisory data used to train the machine learning model may include: first data constituted by the information pertaining to the friction sound and an annotation indicating a paper jam has occurred; and second data constituted by the information pertaining to the friction sound and an annotation indicating a paper jam has not occurred.

Through this, the training accuracy of the trainer is increased, and thus the paper jam indication estimation device can estimate the presence or absence of an indication that a paper jam will occur with good accuracy.

In the paper jam indication estimation device according to the present disclosure, the trained model may include a plurality of trained models, each of which is the trained model, and each corresponding to a different one of a plurality of types of paper; the paper jam indication estimation device may further include an identifier that identifies a type of the paper fed into the paper feed device from the holder; and based on the type of the paper identified by the identifier, the estimator may input the information pertaining to the friction sound into the trained model corresponding to the type of the paper identified.

Through this, the paper jam indication estimation device can switch the trained model to be used according to the type of the paper fed from the holder into the paper feed device. Accordingly, the paper jam indication estimation device can accurately estimate the presence or absence of an indication that a paper jam will occur based on the type of the paper.

In the paper jam indication estimation device according to one aspect of the present disclosure, the identifier may identify the type of the paper based on data obtained by at least one of an image sensor, an ultrasonic sensor, an optical sensor, a weight sensor, or machine learning.

Through this, the paper jam indication estimation device can identify the type of the paper using at least one of a database associating data indicating a feature of the paper with the type of the paper, and a trained model that takes the data indicating a feature of the paper as an input and outputs the type of the paper fed. Accordingly, the paper jam indication estimation device can accurately identify the type of the paper.

In the paper jam indication estimation device according to one aspect of the present disclosure, the machine learning model may be a convolutional neural network model.

Through this, the paper jam indication estimation device can more easily extract regularity of the image (i.e., features) by using a convolutional neural network model.

A paper jam indication estimation method according to one aspect of the present disclosure is a paper jam indication estimation method that estimates an indication that a paper jam will occur in a paper feed device, the paper jam indication estimation method including: collecting a friction sound produced when paper is fed into the paper feed device from a holder holding a plurality of sheets of the paper; estimating, based on an output result obtained by inputting information pertaining to the friction sound into a trained model that is a machine learning model which has been trained, a presence or absence of an indication that a paper jam will occur in the paper feed device; and outputting, when the indication that a paper jam will occur is estimated to be present, a signal, to the paper feed device, that stops the paper from being fed into the paper feed device.

Through this, based on an output result obtained by inputting information pertaining to the friction sound when paper is fed from the holder into a trained model, the paper jam indication estimation method can estimate the presence or absence of an indication that a paper jam will occur, such as lifting of the paper, before the paper jam occurs. Accordingly, it is not necessary to provide an ultrasonic transmitter in order to estimate whether lifting of the paper has occurred, for example, as is the case with the past techniques, and it is sufficient to simply collect the friction sound. As such, the paper jam indication estimation method can estimate the presence or absence of an indication that a paper jam will occur easily and with a simpler configuration than a configuration including an ultrasonic wave emitter.

Additionally, the paper jam indication estimation method can estimate the presence or absence of an indication that a paper jam will occur, such as lifting of the paper being fed, and can therefore not only prevent paper jams from occurring, but can also suppress damage to the paper.

Additionally, a recording medium according to one aspect of the present disclosure is a non-transitory computer-readable recording medium having recorded thereon a program for causing a computer to execute the paper jam indication estimation method described above.

Accordingly, the same effects as those of the above-described paper jam indication estimation method can be achieved using a computer.

Note that these comprehensive or specific aspects may be realized by a system, a method, a device, an integrated circuit, a computer program, or a computer-readable recording medium such as a Compact Disc Read Only Memory (CD-ROM), or may be implemented by any desired combination of systems, methods, devices, integrated circuits, computer programs, and recording media.

Embodiments of the present disclosure will be described in detail hereinafter with reference to the drawings. The numerical values, shapes, materials, constituent elements, arrangements and connection states of constituent elements, steps, orders of steps, and the like in the following embodiments are merely examples, and are not intended to limit the scope of the claims. Additionally, of the constituent elements in the following embodiments, constituent elements not denoted in the independent claims, which express the broadest interpretation, will be described as optional constituent elements. Additionally, the drawings are not necessarily exact illustrations. Configurations that are substantially the same are given the same reference signs in the drawings, and redundant descriptions may be omitted or simplified.

Additionally, in the present disclosure, terms indicating relationships between elements, such as "parallel" and "perpendicular", terms indicating the shapes of elements, such as "rectangular", and numerical values do not express the items in question in the strictest sense, but rather include substantially equivalent ranges, e.g., differences of several percent, as well.

Embodiment 1

Figure 2:
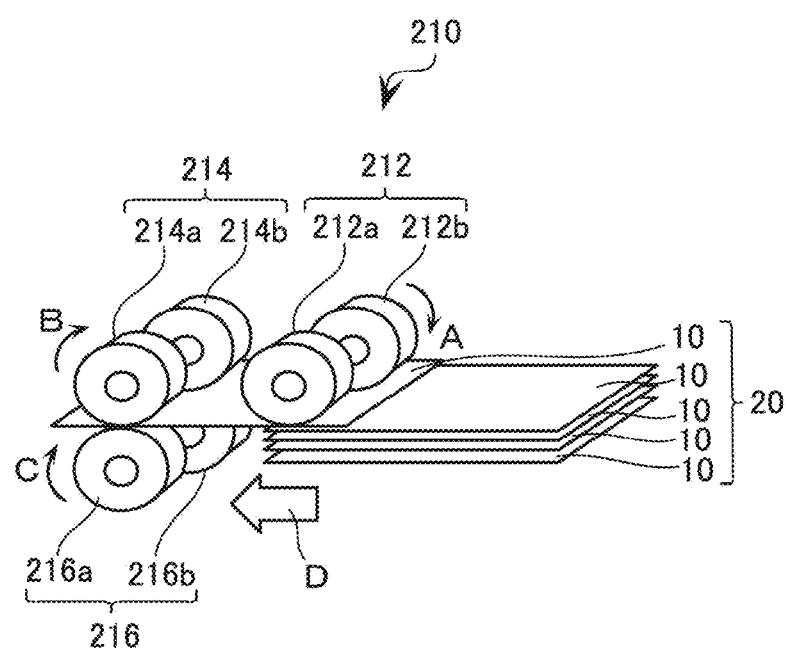
FIG. 2 is a diagram illustrating an example of a transporter of the paper feed device according to Embodiment 1.

Embodiment 1 will be described in detail hereinafter with reference to the drawings.
Paper Feed Device First, a paper feed device will be described with reference to FIGS. 1, 2, and 3. FIG. 1 is a diagram illustrating an example of paper feed device 200 in which paper jam indication estimation device 100 according to Embodiment 1 is applied. FIG. 2 is a diagram illustrating an example of transporter 210 of paper feed device 200 according to Embodiment 1. FIG. 3 is a diagram illustrating an example of the configurations of paper jam indication estimation device 100 and paper feed device 200 according to Embodiment 1.

Paper feed device 200 feeds paper to a processing device (not shown) that processes paper, for example. The processing device may be a processor that processes fed paper itself or performs processing on the paper, a copying device that copies information such as text, symbols, and diagrams printed on the fed paper to another recording medium, an output device that reads such information and outputs the information as an analog image signal, or the like.

As illustrated in FIG. 1, paper feed device 200 includes, for example, feed port 260 that feeds paper 10 from holder 270 which holds a plurality of sheets of paper 10 (see FIG. 2), paper feed rollers 212 that feed paper 10 from feed port 260, separation rollers 214 that separate one sheet at a time of paper 10 fed from feed port 260, and retard rollers 216 that rotate in a direction opposite from a rotation direction of separation rollers 214. In FIG. 1, the plurality of sheets of paper 10 illustrated in FIG. 2 are illustrated as paper bundle 20, which is indicated by hatching for the sake of clarity. Note that the broken line circle indicates an area where a part of the fed paper 10 lifts when paper 10 is fed from holder 270. This area will be called "paper lift area 30" hereinafter. The lifting of paper during feeding will be described later.

Transporter 210 will be described next with reference to FIG. 2. Although feed port 260 and holder 270 are not illustrated in FIG. 2 for the sake of clarity, the plurality of sheets of paper 10 are held in holder 270 as paper bundle 20, and paper 10 is fed from feed port 260.

As illustrated in FIG. 2, paper feed rollers 212, separation rollers 214, and retard rollers 216 are each constituent elements of transporter 210. Transporter 210 separates one sheet at a time of paper 10 fed from holder 270 and transports paper 10. In the following, paper feed roller 212a and paper feed roller 212b may be referred to collectively as "paper feed rollers 212"; separation roller 214a and separation roller 214b, as "separation rollers 214"; and retard roller 216a and retard roller 216b, as "retard rollers 216".

Paper feed roller 212a and paper feed roller 212b are installed so as to be capable of moving up and down freely so as to contact the uppermost paper 10 of the plurality of sheets of paper 10 in paper bundle 20 held by holder 270, and pick up the uppermost paper 10 among the plurality of sheets of paper 10 and feed that paper 10 from feed port 260. Paper feed rollers 212 are configured to be capable of easily changing position in response to changes in the thickness of paper bundle 20 within holder 270 as paper 10 is fed. Note that paper feed rollers 212 may be installed so as to contact the lowermost paper 10 of the plurality of sheets of paper 10 in paper bundle 20. In this case, feed port 260 is located below paper bundle 20.

Separation roller 214a and separation roller 214b separate one sheet at a time of paper 10 fed by paper feed rollers 212. Here, separation roller 214a and separation roller 214b, together with retard roller 216a and retard roller 216b disposed opposite separation roller 214a and separation roller 214b, function as a separator that separates one sheet at a time of paper 10. Retard rollers 216 return the fed paper 10 to holder 270 overlapping paper 10 that is in contact with separation rollers 214.

Specific operations of transporter 210 will be described next. First, by rotating in the direction of arrow A, paper feed rollers 212 pick up the uppermost paper 10 of the plurality of sheets of paper 10 held in holder 270 and feed paper 10 from feed port 260 in the direction of arrow D. Next, by rotating in the direction of arrow B, separation rollers 214 feed paper 10 in contact with separation rollers 214 in the direction of arrow D. At this time, by rotating in the direction of arrow C, retard rollers 216 return paper 10 in contact with retard rollers 216 in the direction opposite from arrow D. Retard rollers 216 have limited torque, and thus when one sheet of paper 10 is fed, paper 10 is fed in the direction of arrow D due to the movement of separation rollers 214. If, for example, two overlapping sheets of paper 10 are fed from paper feed rollers 212, paper 10 contacting separation rollers 214 is fed in the direction of arrow D, and paper 10 contacting retard rollers 216 is returned in the direction opposite from arrow D.

Through the above-described operations, transporter 210 can separate one sheet at a time of paper 10 fed from feed port 260 by paper feed rollers 212 and feed the sheet to a processing device. As a result, transporter 210 can reduce situations where multiple sheets of paper 10 fed from holder 270 are fed together, which makes it possible to reduce paper jams in paper feed device 200.

An example of the functional configuration of paper feed device 200 will be described next with reference to FIG. 3. Descriptions of constituent elements already described with reference to FIGS. 1 and 2 will be omitted or simplified.

As illustrated in FIG. 3, paper feed device 200 includes, for example, transporter 210, driver 220, controller 230 that controls the movement of driver 220, storage 240, and communicator 250.

Driver 220 drives paper feed rollers 212, separation rollers 214, and retard rollers 216 of transporter 210. For example, driver 220 includes one or more motors, and causes paper feed rollers 212, separation rollers 214, and retard rollers 216 to rotate in accordance with control signals from controller 230.

As described above, controller 230 processes information in order to control the operations of transporter 210. Controller 230 may be implemented by a microcomputer, for example, or may be implemented by a processor or dedicated circuitry.

Storage 240 is a storage device that stores control programs and the like executed by controller 230. Storage 240 is implemented by semiconductor memory, for example.

Communicator 250 is a communication module (communication line) for paper feed device 200 to communicate with paper jam indication estimation device 100 and the processing device (not shown) over a local communication network. The communication performed by communicator 250 may be wireless communication or wired communication, for example. The communication standard used in the communication is not particularly limited.

Paper Jam Indication Estimation Device
1. Overview, Etc.

Figure 4:
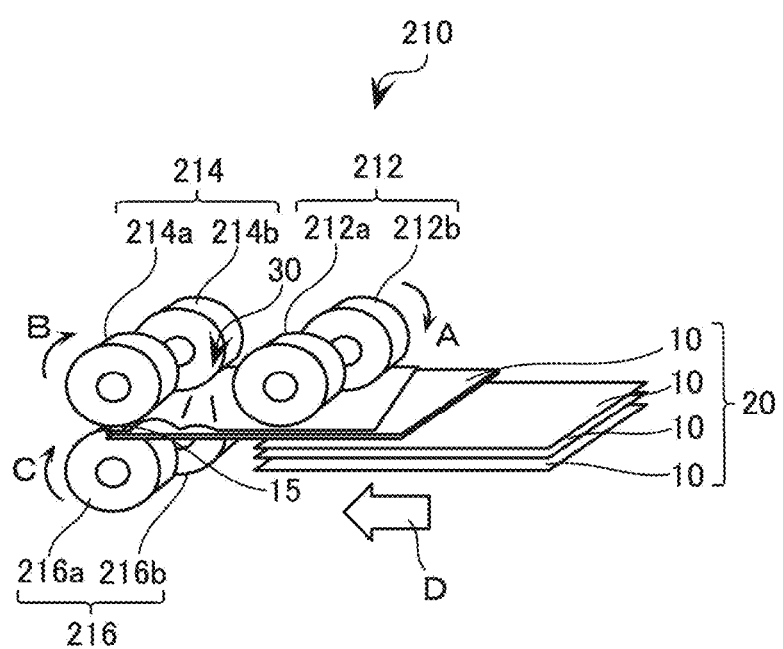
FIG. 4 is a diagram illustrating an example of an indication that a paper jam will occur, according to Embodiment 1.

An overview and the like of paper jam indication estimation device 100 according to Embodiment 1 will be described next with reference to FIGS. 1 and 4. FIG. 4 is a diagram illustrating an example of an indication that a paper jam will occur, according to Embodiment 1. As in FIG. 2, holder 270 is not illustrated in FIG. 4 for the sake of clarity.

Paper jam indication estimation device 100 is a device that estimates whether there is an indication that a paper jam will occur in paper feed device 200. Specifically, paper jam indication estimation device 100 collects a friction sound produced when paper is fed into paper feed device 200 from holder 270 holding the plurality of sheets of paper 10, and based on an output result obtained by inputting information pertaining to the friction sound collected into a trained model, estimates a presence or absence of an indication that a paper jam will occur in paper feed device 200. Then, when an indication that a paper jam will occur is estimated to be present, paper jam indication estimation device 100 outputs, to paper feed device 200, a signal that stops paper 10 from being fed into paper feed device 200 from holder 270.

Note that the trained model is a trained machine learning model. The trained model is obtained by training performed by trainer 140. The trained model is constructed by learning a relationship between (i) a friction sound that occurs when paper 10 is fed from holder 270 into paper feed device 200 and (ii) the presence or absence of an indication that a paper jam will occur. The information pertaining to the friction sound input to the trained model is an image of a spectrogram of the friction sound or an image of a frequency characteristic of the friction sound, for example.

The "friction sound" is, for example, a friction sound produced by friction between the fed paper 10 and paper 10 held in holder 270 when paper 10 is fed from holder 270. Paper 10 held in holder 270 includes paper 10 that is partially held in holder 270. The friction sound is, for example, a friction sound produced by friction between the fed paper 10 and paper 10 held in holder 270 when paper 10 fed from holder 270 is fed at an angle relative to feed port 260 instead of being fed straight, or a friction sound produced by friction between the fed paper 10 and an inner wall of holder 270 or a member in the periphery of feed port 260. The friction sound may also be, for example, a friction sound produced when the state of paper 10 is different from normal, such as when a part of the fed paper 10 is bent or wrinkled, a sticky note or a sticker is affixed, or the like. The friction sound may include an audible sound audible to the human ear and an inaudible sound inaudible to the human ear, but may be an inaudible sound. The inaudible sound is a sound at a frequency in an ultrasonic band, for example. When the friction sound is a sound at a frequency in an ultrasonic band, the frequency band of the friction sound may be at least 60 kHz and at most 95 kHz; of that frequency band, at least 75 kHz and at most 95 kHz; more specifically, at least 80 kHz and at most 95 kHz; and even more specifically, at least 85 kHz and at most 90 kHz.

Paper 10 fed from holder 270 may be a single sheet or a plurality of sheets. Paper 10 is separated one sheet at a time by separation rollers 214 and retard rollers 216 (described later) and fed to the processing device. Paper 10 which is held in holder 270 and produces friction with the fed paper 10 may be the uppermost paper of the plurality of sheets of paper 10 held in holder 270, or may be a plurality of sheets of paper 10 including the uppermost paper 10. Paper jam indication estimation device 100 collects a friction sound produced when paper 10 is fed into paper feed device 200 from holder 270, and based on an output result obtained by inputting information pertaining to the friction sound collected into a trained model, estimates a presence or absence of an indication that a paper jam will occur in paper feed device 200.

The "indication that a paper jam will occur in paper feed device 200" is a precursor to a paper jam, and is a phenomenon that occurs immediately before a paper jam occurs due to a cause of a paper jam. For example, a situation will be described in which the cause of the paper jam is that the fed paper 10 is bound with staple 15 (referred to as being "stapled" hereinafter), as illustrated in FIG. 4. For example, when a plurality of sheets of paper 10 stapled with staple 15 are fed in the direction of arrow D by paper feed rollers 212, of the plurality of sheets of paper 10 stapled with staple 15, only paper 10 that contacts separation rollers 214 is fed in the direction of arrow D by separation rollers 214. At this time, paper 10 lifts around the area that is stapled with staple 15. This phenomenon arises at paper lift area 30 indicated in FIGS. 1 and 4. When paper 10 is fed further in the direction of arrow D by separation rollers 214, paper 10 rotates and bends around the area stapled with staple 15. If paper 10 continues to be fed in the direction of arrow D by separation rollers 214, a paper jam will occur. The occurrence of this phenomenon, in which part of paper 10 fed from holder 270 lifts, is an indication that a paper jam will occur. Paper jam indication estimation device 100 estimates the presence or absence of an indication that a paper jam will occur based on an output result obtained by inputting, into the trained model, information pertaining to a friction sound produced by friction between paper 10 fed from holder 270 and the plurality of sheets of paper 10 held in holder 270.

Although stapling is described as an example of a cause of a paper jam here, the cause of the paper jam is not limited thereto. Causes of paper jams include cases where, for example, a part of the fed paper 10 is bent, a sticky note or the like is attached to the fed paper 10, part of the fed paper 10 is bonded to another sheet of paper 10 with glue or the like, the paper quality of the fed paper 10, such as the roughness of the surface of paper 10, is different from other paper 10, and the like.

Note that the part of the fed paper 10 that lifts when paper 10 is fed from holder 270 is the vicinity of separation rollers 214, and particularly, the area between separation rollers 214 and paper feed rollers 212. For example, the part of the fed paper 10 that lifts may be, when at least two sheets of paper 10 are fed together by paper feed rollers 212, the front side of the point where separation rollers 214 contact the uppermost paper 10 of the at least two sheets of paper 10. The "front side" here refers to the direction opposite from the direction in which paper 10 is fed (the direction of arrow D in the drawing). In other words, the "front side" refers to the holder 270 side when feed port 260 is viewed from holder 270.

As described above, when separation rollers 214 separate only paper 10 that, of at least two sheets of paper 10 fed together by paper feed rollers 212, contacts separation rollers 214, and feed the separated paper 10 toward the processing device, paper jam indication estimation device 100 can estimate the presence or absence of lifting of a part of the fed paper 10 (paper lifting) based on an output result obtained by inputting information pertaining to the friction sound between sheets of paper 10 into the trained model. Accordingly, paper jam indication estimation device 100 can stop the feeding of paper 10 before, for example, the lifted paper 10 rotates or the like and is fed at an angle with respect to the feed direction. As such, paper jam indication estimation device 100 can not only reduce the occurrence of paper jams, but can also suppress damage to paper 10 that is fed, such as bending, wrinkling, tearing, and the like.

Note that the friction sound between sheets of paper 10 is produced by friction between the fed paper 10 and paper 10 held in holder 270, for example. Paper 10 held in holder 270 includes paper 10 that is partially held in holder 270. Accordingly, the friction sound between sheets of paper 10 is, for example, friction sound produced by friction between paper 10 contacting separation rollers 214 and other paper 10 not contacting separation rollers 214 when at least two sheets of paper 10 are fed together by paper feed rollers 212 toward separation rollers 214 and lift in the vicinity of separation rollers 214.

Furthermore, to estimate the cause of a paper jam (i.e., an indication that a paper jam will occur), paper jam indication estimation device 100 need not emit ultrasonic waves toward the plurality of sheets of paper 10 held in holder 270 and detect reflected waves of the emitted ultrasonic waves, and instead collects the friction sound between sheets of paper 10, which is a sound at a frequency in the ultrasonic band. In other words, paper jam indication estimation device 100 only needs to include a passive ultrasonic sensor rather than an active ultrasonic sensor, and can therefore estimate the presence or absence of an indication that a paper jam will occur using a simpler configuration.

2. Configuration

The configuration of paper jam indication estimation device 100 will be described next with reference to FIG. 3.

Paper jam indication estimation device 100 includes information processor 110, storage 120, communicator 130, and trainer 140. Each constituent element will be described hereinafter.

Information Processor

Information processor 110 performs information processing pertaining to the estimation of an indication that a paper jam will occur. Information processor 110 is implemented by a microcomputer or a processor, for example. Specifically, information processor 110 includes sound collector 112, estimator 114, and outputter 116.

Sound Collector

Sound collector 112 collects the friction sound of friction between sheets of paper 10, the friction sound arising when paper 10 is fed from holder 270 holding the plurality of sheets of paper 10. More specifically, sound collector 112 collects the friction sound produced by friction between paper 10 fed from holder 270 and paper held in holder 270. Sound collector 112 is a microphone, for example. In this case, sound collector 112 converts the collected friction sound into an electrical signal and outputs the electrical signal to estimator 114.

When sound collector 112 is a microphone, sound collector 112 is disposed in a position from which the friction sound between sheets of paper 10 can be collected. For example, sound collector 112 may be installed in a position closer to holder 270 than to separation rollers 214, i.e., on the front side when viewing separation rollers 214 from holder 270. More specifically, sound collector 112 may be installed above holder 270. In particular, sound collector 112 may be installed near feed port 260. "Near feed port 260" means above paper feed rollers 212 from a midpoint between feed port 260 and separation rollers 214, for example. In particular, sound collector 112 may be installed above feed port 260 and alongside paper feed rollers 212 with respect to a direction intersecting with a direction in which paper 10 is fed from holder 270. To be more specific, sound collector 112 may be installed above feed port 260 and alongside paper feed rollers 212, with respect to a direction intersecting with a direction in which paper 10 is fed from holder 270, at the same height as paper feed rollers 212. Sound collector 112 may be disposed at any height at which there is no contact with the fed paper 10, and may be disposed alongside paper feed rollers 212 at the same height at a rotation axis of paper feed rollers 212, for example.

Note that sound collector 112 may be installed in any position where the friction sound between sheets of paper 10 can be collected, and is not limited to being installed above feed port 260. For example, sound collector 112 may be installed below feed port 260, or may be installed on a side surface of feed port 260.

Although FIG. 3 illustrates an example in which paper jam indication estimation device 100 includes one sound collector 112, at least two sound collectors 112 may be included. For example, a plurality of (i.e., at least two) sound collectors 112 may be installed on respective sides of paper feed rollers 212 with respect to a direction intersecting with the direction in which paper 10 is fed from holder 270.

Estimator

Estimator 114 estimates the presence or absence of an indication that a paper jam will occur using a trained machine learning model (i.e., a trained model) stored in storage 120, based on an output result obtained by inputting information pertaining to the friction sound collected by sound collector 112 into the trained model. The specific operations performed by estimator 114 will be described later.

The information pertaining to the friction sound input to the trained model is an image of a spectrogram of the friction sound or an image of a frequency characteristic of the friction sound, for example. The information may be, for example, image data in a format such as Joint Photographic Experts Group (JPEG) or Basic Multilingual Plane (bmp), but need not be image data. In this case, the information may be, for example, numerical data in a format such as Waveform Audio File Format (WAV) (and more specifically, numerical data in time series). The information may include at least one of the frequency band of the friction sound and the duration, sound pressure, and waveform of the friction sound, for example.

The output result may be, for example, the presence or absence of an indication that a paper jam will occur, the presence or absence of a reduction in friction, the absolute value of the friction sound, or a relative value with respect to a predetermined value. The presence or absence of a reduction in friction between sheets of paper 10 may be information indicating whether the friction sound (and more specifically, the sound pressure of the friction sound) has decreased by more than a predetermined value (e.g., in the case of the absolute value of a difference in sound pressure, whether that absolute value has increased more than the predetermined value).

Outputter

When estimator 114 estimates that an indication that a paper jam will occur is present, outputter 116 outputs, to paper feed device 200, a signal that stops paper 10 from being fed into paper feed device 200 from holder 270.

Storage

Storage 120 is a storage device that stores computer programs and the like executed by information processor 110. Storage 120 may temporarily store supervisory data and data pertaining to the friction sound collected by sound collector 112. Storage 120 updates the stored trained model to a machine learning model generated by trainer 140 (what is known as a "trained model"). Storage 120 is implemented by semiconductor memory, a Hard Disk Drive (HDD), or the like.

Communicator

Communicator 130 is a communication channel for paper jam indication estimation device 100 to communicate with paper feed device 200. Communicator 130 and paper feed device 200 may communicate directly, or via a relay device such as a wireless router or the like (not shown). Communicator 130 may be, for example, wireless communication circuitry for communicating wirelessly, or wired communication circuitry for communicating over wires. The communication standard of the communication by communicator 130 is not particularly limited.

Trainer

Trainer 140 performs machine learning using the supervisory data. For example, trainer 140 generates a machine learning model that, through machine learning, outputs the presence or absence of an indication that a paper jam will occur, taking the information pertaining to the friction sound as an input. The output may be the presence or absence of an indication that a paper jam will occur, or the presence or absence of a reduction in friction between sheets of paper 10. The trained model is constructed by learning a relationship between (i) the friction sound between sheets of paper 10 and (ii) the presence or absence of an indication that a paper jam will occur. The indication that a paper jam will occur has already been described above, and will therefore not be mentioned here.

The supervisory data used to train the machine learning model includes, for example, first data constituted by the information pertaining to the friction sound and an annotation indicating a paper jam has occurred (i.e., that an indication that a paper jam will occur is present), and second data constituted by the information pertaining to the friction sound and an annotation indicating a paper jam has not occurred (i.e., that an indication that a paper jam will occur is absent). More specifically, the supervisory data includes, for example, first data in which an image of a spectrogram of a friction sound or an image of a frequency characteristic of a friction sound is labeled as an indication that a paper jam will occur being present, and second data in which an image of a spectrogram of a friction sound or an image of a frequency characteristic of a friction sound is labeled as an indication that a paper jam will occur being absent. More specifically, the supervisory data is a dataset including a plurality of sets of (i) information pertaining to friction sounds collected in the past and (ii) paper jam information indicating the presence or absence of a paper jam.

The machine learning model is, for example, a neural network model, and more specifically, is a convolutional neural network (CNN) model. The machine learning model need not be a CNN, and is not particularly limited, and may be a Recurrent Neural Network (RNN) model, for example, if the information pertaining to the friction sound is time-series numerical data (e.g., time-series numerical data of a spectrogram of the friction sound or a frequency characteristic of the friction sound). In other words, the machine learning model may be selected as appropriate according to the format of the input data. The trained machine learning model (i.e., the trained model) generated by trainer 140 includes trained parameters adjusted by the machine learning. Trainer 140 stores the generated trained model in storage 120. Trainer 140 is implemented by, for example, a processor executing a program stored in storage 120.

3. Operations

Figure 5:
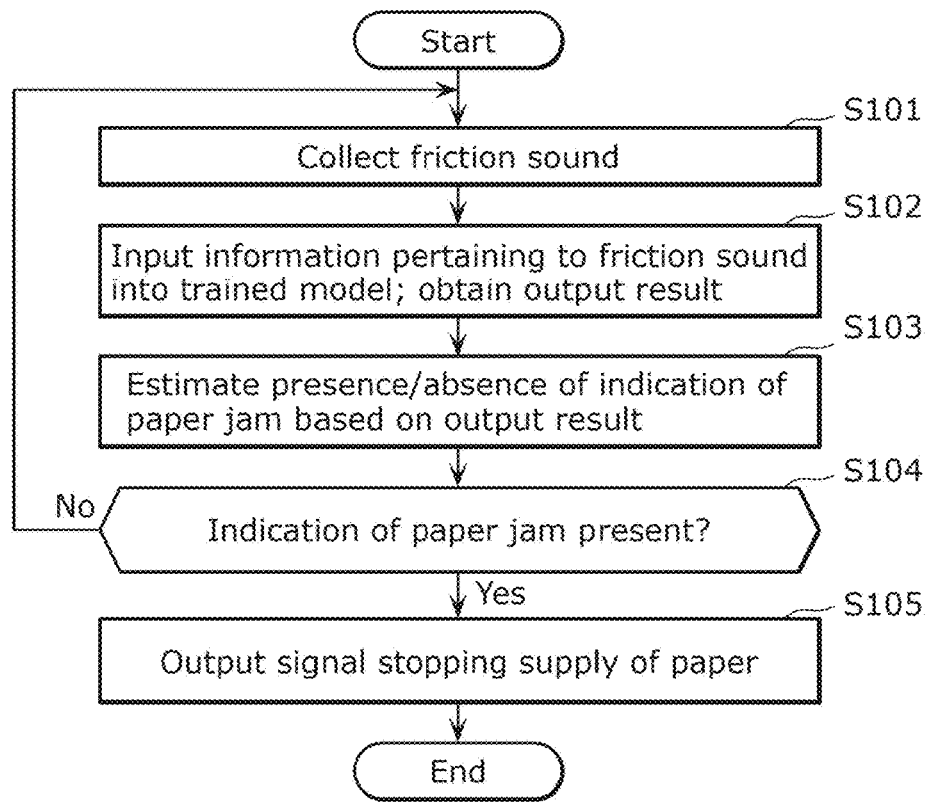
FIG. 5 is a flowchart illustrating operations of the paper jam indication estimation device according to Embodiment 1.

Operations of paper jam indication estimation device 100 will be described next. FIG. 5 is a flowchart illustrating operations of paper jam indication estimation device 100 according to Embodiment 1.

As illustrated in FIG. 5, sound collector 112 collects the friction sound of friction between sheets of paper 10 produced when paper 10 is fed from holder 270 into paper feed device 200 (S101). Here, sound collector 112 is a microphone, for example, and converts the collected friction sound into an electrical signal and outputs the electrical signal resulting from the conversion to estimator 114. A microphone device is included in the microphone. For example, sound collector 112 may be a microphone capable of collecting inaudible sound, or may be a microphone capable of collecting audible sound and inaudible sound and extracting sound in a specific frequency band. Additionally, sound collector 112 may be directional microphone. Sound collector 112 may be a MEMS microphone, for example. The inaudible sound is a sound at a frequency in an ultrasonic band, for example. For example, when estimator 114 takes information pertaining to inaudible sound among the collected friction sound as an input, sound collector 112 may extract inaudible sound (e.g., sound at a frequency in an ultrasonic band) from the collected friction sound and convert the inaudible sound into an electrical signal, and then output the electrical signal resulting from the conversion to estimator 114.

Next, estimator 114 inputs the information pertaining to the friction sound collected by sound collector 112 into the trained model and obtains an output result (S102). More specifically, in step S102, first, estimator 114 obtains the electrical signal output from sound collector 112, and converts the obtained electrical signal into a digital signal through a Pulse Code Modulation (PCM) or the like. At this time, for example, estimator 114 may obtain an electrical signal of a friction sound including audible sound and inaudible sound collected by sound collector 112, convert the electrical signal into a digital signal, and then extract a digital signal of the inaudible sound. Estimator 114 then generates an image of a spectrogram of the friction sound or an image of a frequency characteristic of the friction sound based on the digital signal. Although the image of a spectrogram of the friction sound or the image of the frequency characteristic of the friction sound are information pertaining to the friction sounds input to the trained model, the digital signals (i.e., time-series numerical data of the spectrogram of the friction sound or the frequency characteristic of the friction sound) may also be used as the information pertaining to the friction sound. Next, estimator 114 inputs the generated information pertaining to the friction sound into the trained model and obtains an output result. As described above, the output result may be the presence or absence of an indication that a paper jam will occur, the presence or absence of a reduction in friction between sheets of paper 10, the absolute value of the friction sound, or a relative value with respect to a predetermined value.

Next, based on the output result obtained in step S102, estimator 114 estimates the presence or absence of an indication that a paper jam will occur (S103). In step S103, if estimator 114 estimates that an indication that a paper jam will occur is present (Yes in S104), outputter 116 outputs, to paper feed device 200, a signal that stops paper 10 from being fed into paper feed device 200 from holder 270 (S105). More specifically, in step S104, when an output result indicating that an indication that a paper jam will occur is present is obtained from the trained model, estimator 114 estimates that an indication that a paper jam will occur is present based on the output result. Additionally, in step S104, when an output result indicating that "friction between the sheets of paper 10 has decreased" is obtained from the trained model, estimator 114 may estimate that an indication that a paper jam will occur is present based on the output result.

On the other hand, in step S103, if estimator 114 estimates that an indication that a paper jam will occur is absent (No in S104), paper jam indication estimation device 100 returns to the processing of step S101. More specifically, in step S104, when an output result indicating that an indication that a paper jam will occur is absent is obtained from the trained model, estimator 114 estimates that an indication that a paper jam will occur is absent based on the output result. Additionally, in step S104, when an output result indicating that "there is no decrease in friction between the sheets of paper 10" is obtained from the trained model, estimator 114 estimates that an indication that a paper jam will occur is absent based on the output result.

Paper jam indication estimation device 100 repeats the above-described processing flow each time paper 10 is fed from holder 270.

4. Effects, Etc.

As described above, paper jam indication estimation device 100 according to Embodiment 1 is a paper jam indication estimation device that estimates an indication that a paper jam will occur in paper feed device 200, and includes: sound collector 112 that collects a friction sound produced when paper 10 is fed into paper feed device 200 from holder 270 holding a plurality of sheets of paper 10; estimator 114 that, based on an output result obtained by inputting information pertaining to the friction sound into a trained model that is a machine learning model which has been trained, estimates a presence or absence of an indication that a paper jam will occur in paper feed device 200; and outputter 116 that, when estimator 114 estimates that the indication that a paper jam will occur is present, outputs, to paper feed device 200, a signal that stops paper 10 from being fed into paper feed device 200.

Through this, paper jam indication estimation device 100 can collect a friction sound when paper 10 is fed into paper feed device 200 from holder 270, and based on an output result obtained by inputting information pertaining to the friction sound collected into a trained model, can estimate the presence or absence of an indication that a paper jam will occur, such as lifting of paper 10, before the paper jam occurs. Accordingly, it is not necessary to provide an ultrasonic transmitter in order to estimate whether lifting of paper 10 has occurred, for example, as is the case with the past techniques, and it is sufficient to provide only sound collector 112 that collects the friction sound. As such, paper jam indication estimation device 100 can estimate the presence or absence of an indication that a paper jam will occur easily and with a simpler configuration than a configuration including an ultrasonic wave emitter.

Additionally, paper jam indication estimation device 100 can estimate the presence or absence of an indication that a paper jam will occur, such as lifting of paper 10 being fed, and can therefore not only prevent paper jams from occurring, but can also suppress damage to paper 10.

In paper jam indication estimation device 100 according to Embodiment 1, the information pertaining to the friction sound input into the trained model may be an image of a spectrogram of the friction sound or an image of a frequency characteristic of the friction sound.

Through this, paper jam indication estimation device 100 can more easily extract regularity of the image (i.e., features) by using a machine learning model. Accordingly, paper jam indication estimation device 100 can more easily estimate the presence or absence of an indication that a paper jam will occur.

In paper jam indication estimation device 100 according to Embodiment 1, the friction sound may be an inaudible sound produced by friction between paper 10 fed from holder 270 and paper 10 held in holder 270. In this case, the inaudible sound may be a sound at a frequency in an ultrasonic band.

Through this, paper jam indication estimation device 100 estimates the presence or absence of lifting in paper 10 based on an inaudible sound in the friction sound produced when paper 10 is fed from holder 270 (e.g., sound at a frequency in an ultrasonic band), and thus is not susceptible to the effects of various audible sounds produced in the periphery of the paper jam indication estimation device, i.e., sounds that are noise, and thus collects sound more accurately. As such, paper jam indication estimation device 100 can estimate the presence or absence of an indication that a paper jam will occur with good accuracy.

In paper jam indication estimation device 100 according to Embodiment 1, supervisory data used to train the machine learning model may include: first data constituted by the information pertaining to the friction sound and an annotation indicating a paper jam has occurred; and second data constituted by the information pertaining to the friction sound and an annotation indicating a paper jam has not occurred.

Through this, the training accuracy of trainer 140 is increased, and thus paper jam indication estimation device 100 can estimate the presence or absence of an indication that a paper jam will occur with good accuracy.

In paper jam indication estimation device 100 according to Embodiment 1, the machine learning model may be a convolutional neural network model.

Through this, the paper jam indication estimation device can more easily extract regularity of the image (i.e., features) by using a convolutional neural network model.

Variation 1 on Embodiment 1

Figure 6:
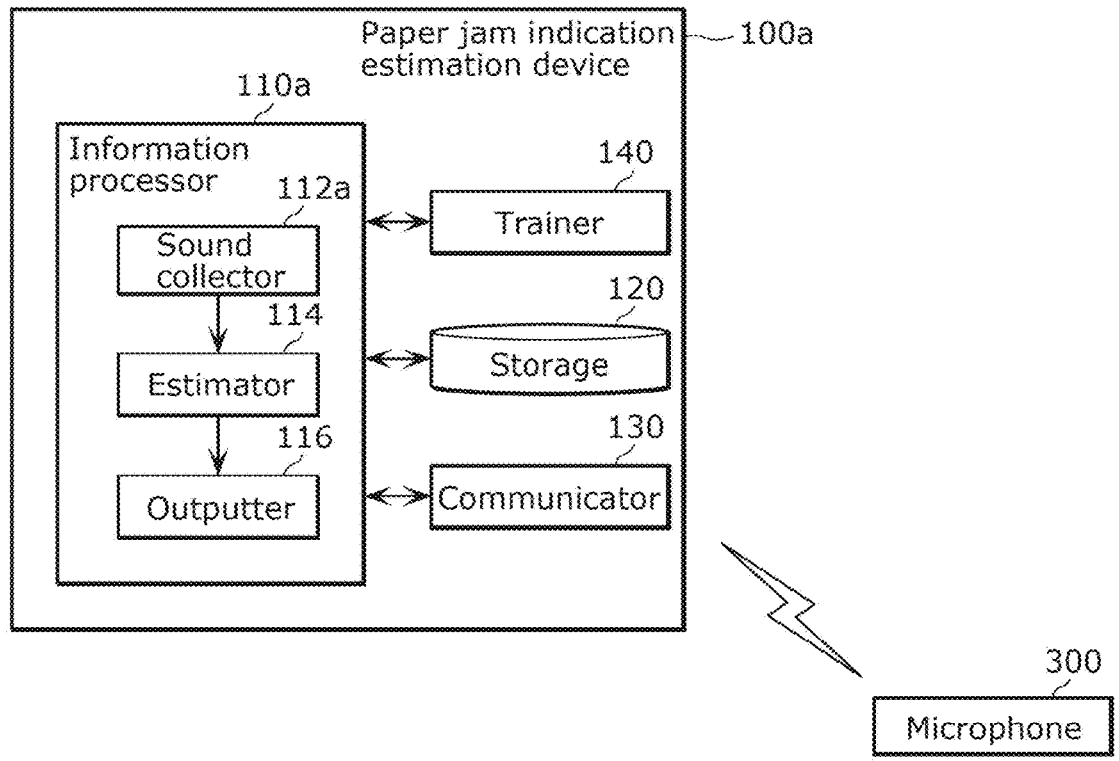
FIG. 6 is a diagram illustrating an example of the configuration of a paper jam indication estimation device according to Variation 1 on Embodiment 1.

Paper jam indication estimation device 100a according to Variation 1 on Embodiment 1 will be described next with reference to FIG. 6. FIG. 6 is a diagram illustrating an example of the configuration of paper jam indication estimation device 100a according to Variation 1 on Embodiment 1. Embodiment 1 described an example in which sound collector 112 is a microphone, but Variation 1 on Embodiment 1 differs from Embodiment 1 in that sound collector 112a obtains an electrical signal, including friction sound, output from microphone 300. The following will focus on points different from Embodiment 1, and descriptions of identical details will be simplified or omitted.

1. Configuration

As illustrated in FIG. 6, in Variation 1 on Embodiment 1, paper jam indication estimation device 100a is connected to microphone 300 through communicator 130. Paper jam indication estimation device 100a includes information processor 110a, storage 120, communicator 130, and trainer 140. Information processor 110a includes sound collector 112a, estimator 114, and outputter 116. Sound collector 112a will be described hereinafter.

Sound collector 112a obtains, as an electrical signal, a friction sound collected by at least one microphone 300, for example, and outputs the obtained electrical signal to estimator 114. At this time, sound collector 112a may obtain, for example, an electrical signal output from at least one microphone 300 and information indicating microphone 300 from which the electrical signal was output, and output the obtained information and electrical signal to estimator 114. For example, when the friction sound is an inaudible sound (e.g., a sound at a frequency in an ultrasonic band), an electrical signal indicating the sound pressure at the frequency in the ultrasonic band may be extracted from the obtained electrical signal and output to estimator 114, 2. Operations In Variation 1 on Embodiment 1, sound collector 112a obtains the electrical signal corresponding to the friction sound collected by microphone 300, and thus the processing of step S101 in FIG. 5, referenced in Embodiment 1, is different.

For example, in step S101 of FIG. 5, sound collector 112a obtains an electrical signal corresponding to the friction sound collected by microphone 300. Sound collector 112a then outputs the obtained electrical signal to estimator 114. In this case, sound collector 112a functions as what will be called an "obtainer".

Additionally, if, for example, friction sounds have been collected by a plurality of microphones 300, in step S101 of FIG. 5, sound collector 112a obtains electrical signals corresponding to the friction sounds collected by the plurality of microphones 300. At this time, sound collector 112a may obtain electrical signals output from the plurality of microphones 300 and information indicating the microphones 300 that output the electrical signals. Sound collector 112a then outputs the obtained electrical signal and information to estimator 114.

As described thus far, Variation 1 on Embodiment 1 differs from Embodiment 1 in that paper jam indication estimation device 100a obtains an electrical signal including friction sound collected by microphone 300 and performs information processing pertaining to indication estimation.

3. Effects, Etc.

Paper jam indication estimation device 100a according to Variation 1 on Embodiment 1 is configured as an entity separate from microphone 300, and thus the position and number of microphone 300 can be changed as appropriate according to the design, making it possible to implement paper jam indication estimation device 100a in a single integrated circuit.

Embodiment 2

A paper jam indication estimation device according to Embodiment 2 will be described next. FIG. 7 is a diagram illustrating an example of the configurations of paper jam indication estimation device 100b and paper feed device 200 according to Embodiment 2. Embodiment 2 differs from Embodiment 1 and Variation 1 on Embodiment 1 in that, in addition to the configuration of Embodiment 1, paper jam indication estimation device 100b includes identifier 113a that identifies a type of paper 10 fed from holder 270 into paper feed device 200, and the trained model includes a plurality of trained models each corresponding to one of a plurality of types of paper. The following will focus on points different from Embodiment 1 and Variation 1 on Embodiment 1, and redundant descriptions will be omitted or simplified.

1. Configuration

Paper jam indication estimation device 100b includes information processor 110b, storage 120, communicator 130, and trainer 140a. Information processor 110b includes sound collector 112, identifier 113a, estimator 114a, and outputter 116. Identifier 113a, estimator 114a, and trainer 140a will be described hereinafter.

Identifier

Identifier 113a identifies a type of paper 10 fed from holder 270 into paper feed device 200. More specifically, identifier 113a identifies the type of paper 10 based on a friction sound between sheets of paper 10 produced when paper 10 is fed from holder 270 into paper feed device 200. For example, identifier 113a obtains the friction sound from sound collector 112 using the friction sound being collected by sound collector 112 as a trigger. Here, in addition to the type of paper 10 (e.g., copy paper, typewriter paper, tracing paper, heavy paper, and the like), the type of paper 10 may also include a size of paper 10 (e.g., A4 size, B5 size, A3 size, and the like).

For example, identifier 113a identifies the type of paper 10 based on an output result obtained by inputting the obtained friction sound (and more specifically, information pertaining to the friction sound) into a trained model indicating a relationship between the friction sound and the type of paper 10 (also called a "second trained model" hereinafter). Note that the friction sound used by identifier 113a may be a friction sound at a time different from the friction sound used by estimator 114a. More specifically, the friction sound used to identify paper 10 is a friction sound between sheets of paper when paper 10 begins to be fed from holder 270 to feed port 260 by paper feed rollers 212 (see FIG. 1), and is a friction sound between sheets of paper 10 before paper lifting occurs near separation rollers 214.

Estimator

Based on the type of paper 10 identified by identifier 113a, estimator 114a inputs the information pertaining to the friction sound into a trained model corresponding to the type of paper 10 identified (also called a "first trained model" hereinafter). The trained model generated by trainer 140a includes a plurality of the first trained models each corresponding to one of the plurality of types of paper 10. Based on the type of paper 10 identified by identifier 113a, estimator 114a selects the first trained model, among the plurality of first trained models stored in storage 120, that corresponds to the identified type of paper 10. Then, estimator 114a obtains the friction sound between the sheets of paper 10 collected by sound collector 112, and inputs information pertaining to the obtained friction sound into the selected first trained model. Estimator 114a estimates the presence or absence of an indication that a paper jam will occur based on an output result from the first trained model.

Trainer

Trainer 140a performs machine learning using supervisory data. For example, for each of the plurality of types of paper 10, trainer 140a uses machine learning to generate a plurality of first trained models each taking the information pertaining to the friction sound as an input and outputting the presence or absence of an indication that a paper jam, such as paper lifting, will occur. In other words, trainer 140a generates a first trained model corresponding to each of the plurality of types of paper 10. The supervisory data includes first data constituted by the information pertaining to the friction sound and an annotation indicating a paper jam has occurred, and second data constituted by the information pertaining to the friction sound and an annotation indicating a paper jam has not occurred, for each of the plurality of types of paper 10 (i.e., for each type of paper 10).

Furthermore, using machine learning, trainer 140a generates the second trained model taking the friction sound (i.e., the information pertaining to the friction sound) as an input and outputting the type of paper 10. The supervisory data includes data constituted by the information pertaining to friction sounds and annotations indicating types of paper 10. The information pertaining to the friction sounds used for the supervisory data may be generated using friction sounds between sheets of paper 10 when paper 10 starts being fed from holder 270 to feed port 260 by paper feed rollers 212, but may be generated using friction sounds from when paper jams have not occurred. The information pertaining to the friction sounds may be images of spectrograms of the friction sounds, or images of frequency characteristics of the friction sounds, for example. In this case, the machine learning model may be a CNN model. Additionally, the information pertaining to the friction sounds may be time-series numerical data including electrical signals (e.g., digitally converted signals) corresponding to the friction sounds. In this case, the machine learning model may be an RNN model.

2. Operations

Figure 8:
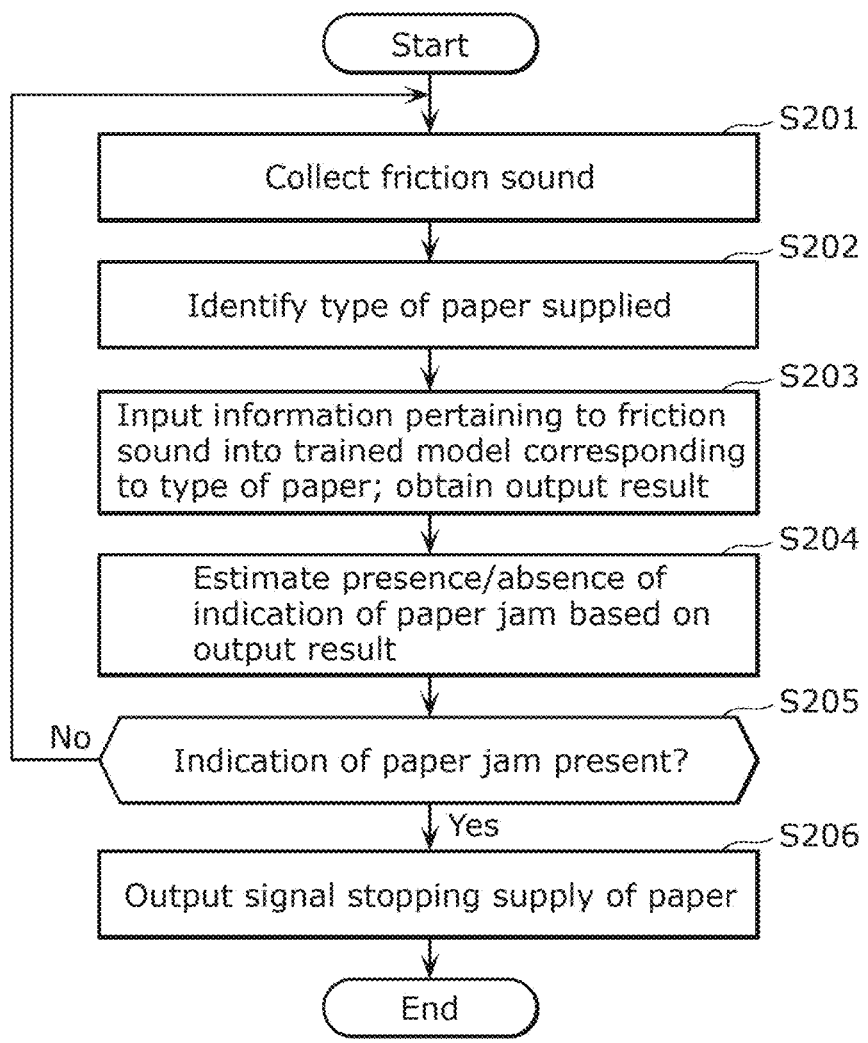
FIG. 8 is a flowchart illustrating operations of the paper jam indication estimation device according to Embodiment 2.

Operations of paper jam indication estimation device 100b will be described next. FIG. 8 is a flowchart illustrating operations of paper jam indication estimation device 100b according to Embodiment 2.

As illustrated in FIG. 8, sound collector 112 collects the friction sound of friction between sheets of paper 10 produced when paper 10 is fed from holder 270 into paper feed device 200 (S201). Here, sound collector 112 is a microphone, for example, but may function as an obtainer that obtains a friction sound collected by microphone 300 as an electrical signal, as in Variation 1 on Embodiment 1.

Next, identifier 113a identifies the type of paper 10 fed from holder 270 into paper feed device 200 based on the friction sound collected by sound collector 112 in step S201 (S202). For example, identifier 113a obtains the friction sound from sound collector 112 using the friction sound being collected by sound collector 112 as a trigger. At this time, identifier 113a identifies the type of paper 10 based on data obtained through machine learning. For example, identifier 113a may identify the type of paper 10 based on an output result obtained by inputting the friction sound (and more specifically, the information pertaining to the friction sound) into the second trained model indicating the relationship between (i) friction sounds between sheets of paper 10 and (ii) the type of paper 10.

Next, estimator 114a inputs the information pertaining to the friction sound collected by sound collector 112 in step S201 into the first trained model corresponding to the type of paper 10 identified by identifier 113a in step S202, and obtains an output result (S203). More specifically, based on the type of paper 10 identified by identifier 113a, estimator 114a selects a first trained model corresponding to the type of paper 10 from among the plurality of first trained models stored in storage 120, and inputs the information pertaining to the friction sound into the selected first trained model. In other words, estimator 114a switches the first trained model according to the type of paper 10 fed from holder 270 into paper feed device 200.

Next, based on the output result obtained in step S203, estimator 114a estimates the presence or absence of an indication that a paper jam will occur (S204). In step S204, if estimator 114a estimates that an indication that a paper jam will occur is present (Yes in S205), outputter 116 outputs, to paper feed device 200, a signal that stops paper 10 from being fed into paper feed device 200 from holder 270 (S206). On the other hand, in step S204, if estimator 114a estimates that an indication that a paper jam will occur is absent (No in S205), paper jam indication estimation device 100b returns to the processing of step S201.

3. Effects, Etc.

As described above, in paper jam indication estimation device 100b according to Embodiment 2, the trained model includes a plurality of trained models (first trained models), each of which is the trained model, and each corresponding to a different one of a plurality of types of paper 10; paper jam indication estimation device 100b further includes identifier 113a that identifies a type of paper 10 fed into paper feed device 200 from holder 270; and based on the type of paper 10 identified by identifier 113a, estimator 114a inputs the information pertaining to the friction sound into the trained model (first trained model) corresponding to the type of paper 10 identified.

Through this, paper jam indication estimation device 100b can switch the trained model to be used according to the type of paper 10 fed from holder 270 into paper feed device 200. Accordingly, paper jam indication estimation device 100*b* can accurately estimate the presence or absence of an indication that a paper jam will occur based on the type of paper 10.

In paper jam indication estimation device 100*b* according to Embodiment 2, identifier 113*a* may identify the type of paper 10 based at least on data obtained through machine learning.

Through this, paper jam indication estimation device 100*b* can accurately identify the type of paper 10 fed based on the data obtained through machine learning.

Variation 1 on Embodiment 2

Figure 9:
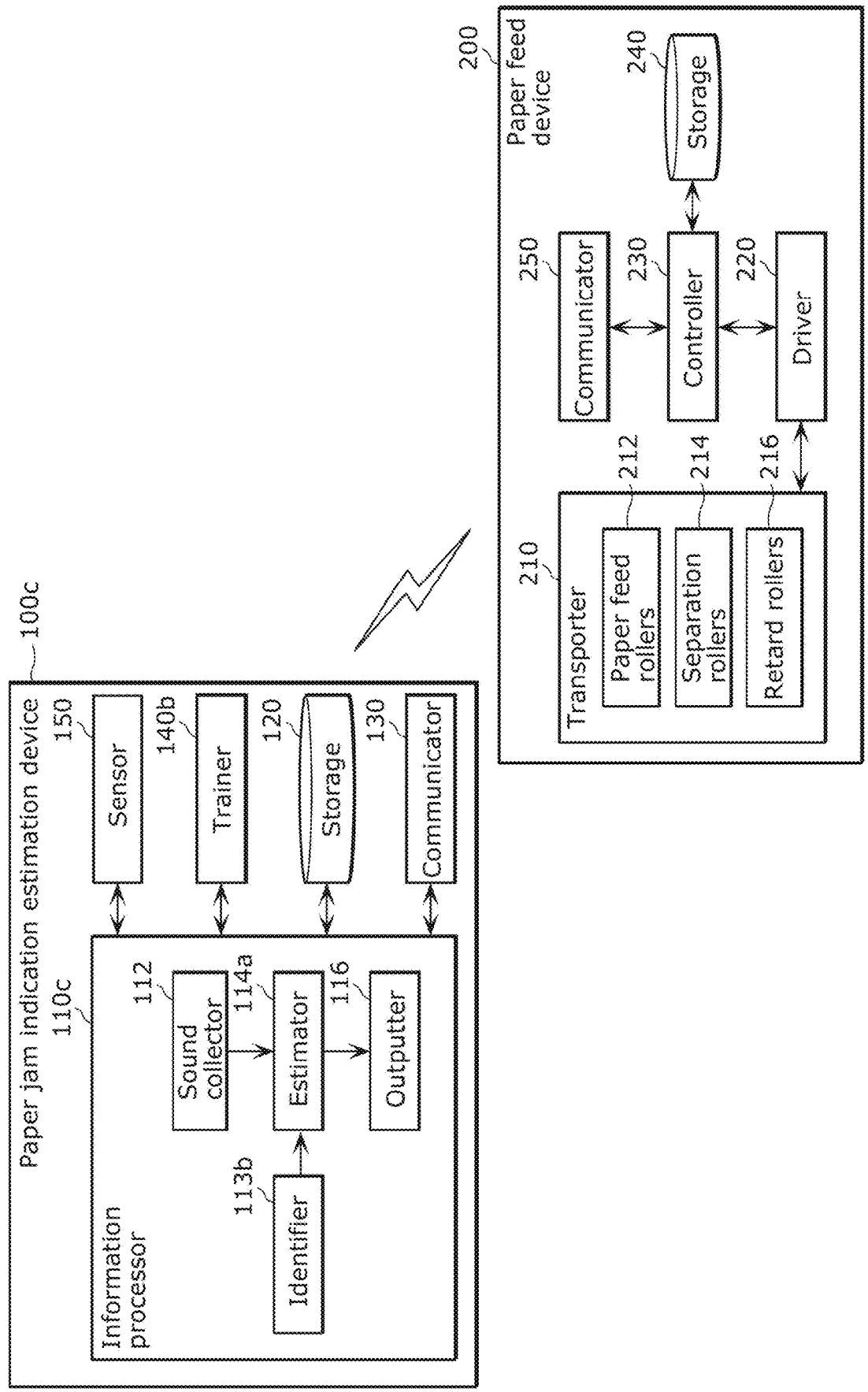
FIG. 9 is a diagram illustrating an example of the configurations of a paper jam indication estimation device and a paper feed device according to Variation 1 on Embodiment 2.

A paper jam indication estimation device according to Variation 1 on Embodiment 2 will be described next. FIG. 9 is a diagram illustrating an example of the configurations of paper jam indication estimation device 100*c* and paper feed device 200 according to Variation 1 on Embodiment 2. Although paper jam indication estimation device 100*b* according to Embodiment 2 identified the type of paper 10 based on a friction sound collected by sound collector 112, paper jam indication estimation device 100*c* according to Variation 1 on Embodiment 2 differs from Embodiment 2 in that the type of paper is identified based on sensing data indicating a feature of paper 10, such as a surface roughness of paper 10.

1. Configuration

Paper jam indication estimation device 100*c* includes information processor 110*c*, storage 120, communicator 130, trainer 140*b*, and sensor 150. Information processor 110*c* includes sound collector 112, identifier 113*b*, estimator 114*a*, and outputter 116. Identifier 113*b*, estimator 114*a*, trainer 140*b*, and sensor 150 will be described hereinafter.

Identifier

Identifier 113*b* identifies a type of paper 10 fed from holder 270 into paper feed device 200. More specifically, identifier 113*b* identifies the type of paper 10 based on data obtained by sensor 150 (also called "sensing data"). The sensing data is data indicating a feature of paper 10. The feature of paper 10 is, for example, the smoothness of the surface of paper 10, the presence or absence of gloss on the surface, the thickness, the weight, the size, or the like. Identifier 113*b* may identify the type of paper 10 using a database that associates sensing data with types of paper 10, or may identify the type of paper 10 using a trained model that takes sensing data as an input and outputs the type of paper 10 (also called a "third trained model" hereinafter). Note that identifier 113*b* may also use a database and the third trained model together.

Estimator

Based on the type of paper 10 identified by identifier 113*b*, estimator 114*a* inputs the information pertaining to the friction sound into a first trained model corresponding to the identified paper 10. More specifically, based on the type of paper 10 identified by identifier 113*b*, estimator 114*a* selects the first trained model, among the plurality of first trained models stored in storage 120, that corresponds to the identified paper 10. Then, estimator 114*a* obtains the friction sound between the sheets of paper 10 collected by sound collector 112, and inputs information pertaining to the obtained friction sound into the selected first trained model. Estimator 114*a* estimates the presence or absence of an indication that a paper jam will occur based on an output result from the first trained model.

Trainer

Trainer 140*b* performs machine learning using supervisory data. In other words, trainer 140*b* generates a first trained model corresponding to each of the plurality of types of paper 10, in the same manner as in Embodiment 2.

Furthermore, through machine learning, trainer 140*b* may, for corresponding ones of the plurality of types of paper 10, generate a plurality of third trained models, each taking at least one instance of data indicating a feature of paper 10, such as the roughness of the surface of paper 10, the reflectance of the surface of paper 10, and the light transmittance of paper 10, as an input, and outputting the type of paper 10. Supervisory data includes data constituted by information indicating features of paper 10 and annotations indicating types of paper 10. The information indicating features of paper 10 may be, for example, data indicating at least one of the roughness of the surface of paper 10, the reflectance of the surface of paper 10, and the light transmittance of paper 10. The data may be in the form of an image, or time-series numerical data, for example.

Sensor

Sensor 150 obtains data (sensing data) indicating a feature of paper 10 fed from holder 270 into paper feed device 200. For example, sensor 150 operates as a trigger for sound collector 112 to collect the friction sound. Sensor 150 includes at least one of an image sensor, an ultrasonic sensor, an optical sensor, or a weight sensor, for example. An image sensor obtains image data indicating a feature of the surface of paper 10 by capturing an image of paper 10. An ultrasonic sensor obtains data indicating the thickness of paper 10 by transmitting ultrasonic waves through paper 10. An optical sensor obtains data indicating the smoothness of the surface of paper 10, the presence or absence of gloss, and the like by irradiating the surface of paper 10 with light. A weight sensor obtains data indicating the weight of paper 10.

2. Operations

Figure 10:
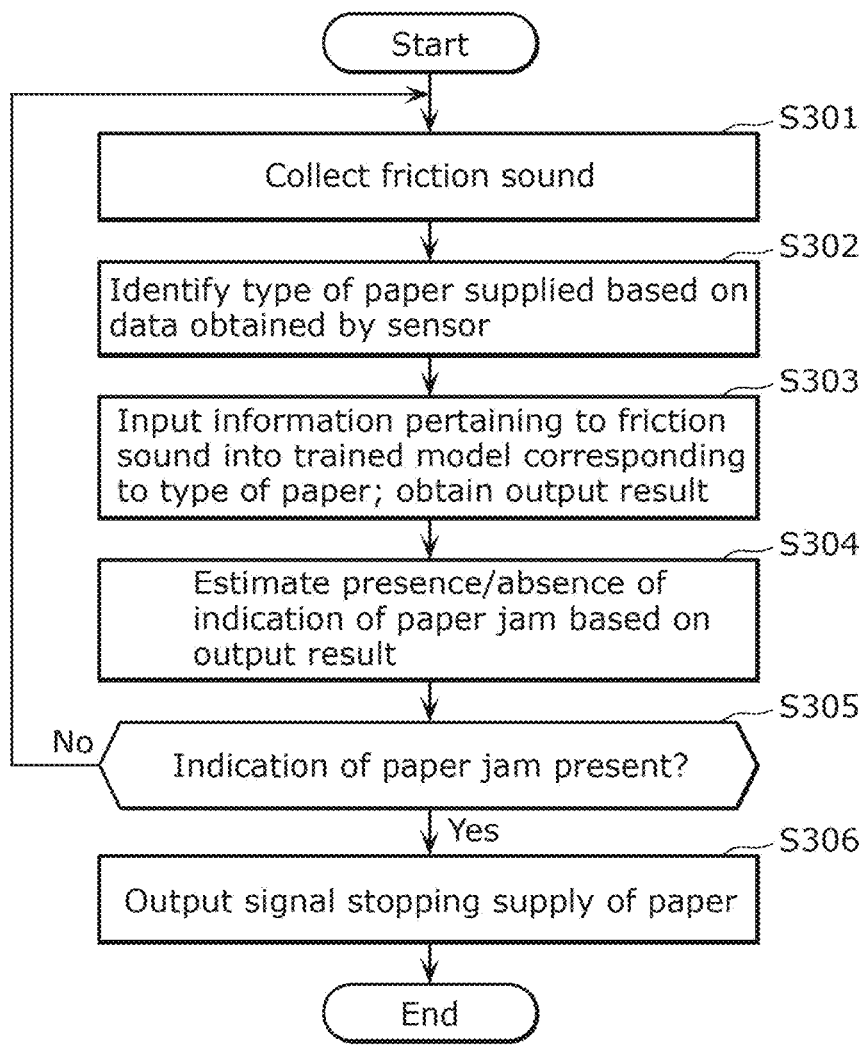
FIG. 10 is a flowchart illustrating operations of the paper jam indication estimation device according to Variation 1 on Embodiment 2.

Operations of paper jam indication estimation device 100*c* will be described next. FIG. 10 is a flowchart illustrating operations of the paper jam indication estimation device according to Variation 1 on Embodiment 2.

As illustrated in FIG. 10, sound collector 112 collects the friction sound of friction between sheets of paper 10 produced when paper 10 is fed from holder 270 into paper feed device 200 (S301). Here, sound collector 112 is a microphone, for example, but may function as an obtainer that obtains a friction sound collected by microphone 300 as an electrical signal, as in Variation 1 on Embodiment 1.

Although not illustrated in the drawings, sensor 150 operates as a trigger for sound collector 112 to collect the friction sound, and obtains data indicating a feature of paper 10.

Next, based on the data obtained by sensor 150, identifier 113*b* identifies the type of paper 10 fed from holder 270 into paper feed device 200 (S302). For example, identifier 113*b* may identify the type of paper 10 using a database that associates sensing data with types of paper 10, or may identify the type of paper 10 using a trained model that takes sensing data as an input and outputs the type of paper 10 (also called a "third trained model" hereinafter). Note that identifier 113*b* may also use a database and the third trained model together.

Next, estimator 114*a* inputs the information pertaining to the friction sound collected by sound collector 112 in step S301 into the trained model corresponding to the type of paper 10 identified by identifier 113*b* in step S302, and obtains an output result (S303). More specifically, based on the type of paper 10 identified by identifier 113*b*, estimator 114*a* selects a first trained model corresponding to the type of paper 10 from among the plurality of first trained models stored in storage 120, and inputs the information pertaining to the friction sound into the selected first trained model. In other words, estimator 114*a* switches the first trained model according to the type of paper 10 fed from holder 270 into paper feed device 200.

Next, based on the output result obtained in step S303, estimator 114*a* estimates the presence or absence of an indication that a paper jam will occur (S304). In step S304, if estimator 114*a* estimates that an indication that a paper jam will occur is present (Yes in S305), outputter 116 outputs, to paper feed device 200, a signal that stops paper 10 from being fed into paper feed device 200 from holder 270 (S306). On the other hand, in step S304, if estimator 114*a* estimates that an indication that a paper jam will occur is absent (No in S305), paper jam indication estimation device 100*c* returns to the processing of step S301.

3. Effects, Etc.

As described above, in paper jam indication estimation device 100*c* according to Variation 1 on Embodiment 2, the trained model includes a plurality of trained models (first trained models), each of which is the trained model, and each corresponding to a different one of a plurality of types of paper 10; paper jam indication estimation device 100*c* further includes identifier 113*b* that identifies a type of paper 10 fed into paper feed device 200 from holder 270; and based on the type of paper 10 identified by identifier 113*b*, estimator 114*a* inputs the information pertaining to the friction sound into the trained model (first trained model) corresponding to the type of paper 10 identified.

Through this, paper jam indication estimation device 100*c* can switch the trained model to be used according to the type of paper 10 fed from holder 270 into paper feed device 200. Accordingly, paper jam indication estimation device 100*c* can accurately estimate the presence or absence of an indication that a paper jam will occur based on the type of paper 10.

In paper jam indication estimation device 100*c* according to Variation 1 on Embodiment 2, identifier 113*b* may identify the type of paper 10 based on data obtained by at least one of an image sensor, an ultrasonic sensor, an optical sensor, a weight sensor, or machine learning.

Through this, paper jam indication estimation device 100*c* can identify the type of paper 10 using at least one of a database associating data indicating a feature of paper 10 with the type of paper 10, and a trained model (also called a "third trained model") that takes the data indicating a feature of paper 10 as an input and outputs the type of paper 10 fed. Accordingly, paper jam indication estimation device 100*c* can accurately identify the type of paper 10.

WORKING EXAMPLES

The paper jam indication estimation device and the paper jam indication estimation method according to the present disclosure will be described in detail hereinafter according to working examples, but the following working examples are merely examples, and the present disclosure is not intended to be limited to the following working examples in any way.

For (1) a machine learning model used in Working Example 1 and Working Example 2, the following will describe (2) the estimation accuracy for each of types of paper when a single trained model (i.e., the first trained model) is used, and (3) the estimation accuracy for each paper when trained models corresponding to each of eight types of paper (i.e., the first trained models) are used.

(1) Machine Learning Model Used in Working Example 1 and Working Example 2

Figures 11, 12:
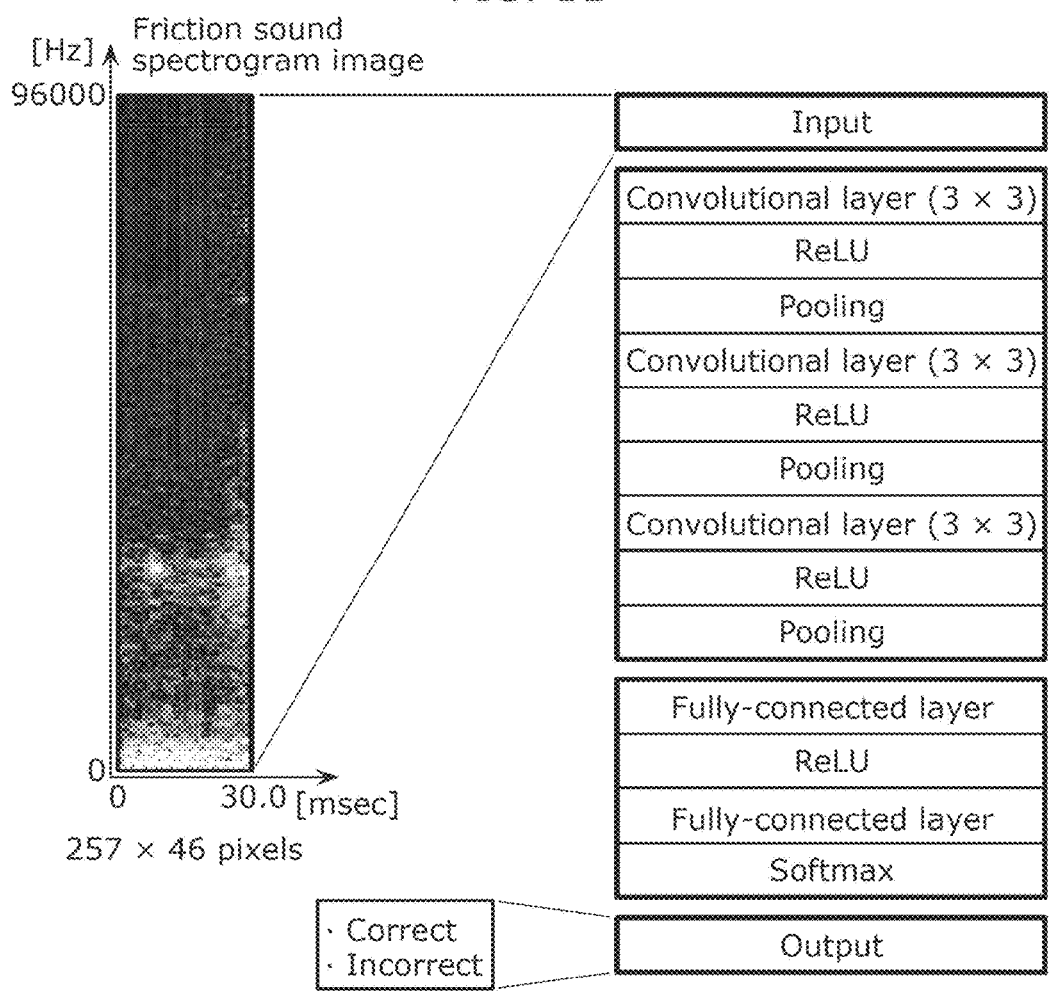
FIG. 11 is a diagram illustrating a machine learning model used in Working Example 1 and Working Example 2.
FIG. 12 is a diagram illustrating results of Working Example 1.

FIG. 11 is a diagram illustrating a machine learning model used in Working Example 1 and Working Example 2. As illustrated in FIG. 11, the machine learning model used in Working Example 1 and Working Example 2 is a convolutional neural network (CNN) model. The machine learning model is constituted by an input layer, convolutional layers (3×3), Rectified Linear Unit (ReLU) layers, pooling layers, fully-connected layers, a classification layer including a Softmax layer, and an output layer.

(1-1) Machine Learning Model Used in Working Example 1

The machine learning model used in Working Example 1 was a single model, and was trained using the following supervisory data.

number of data: 560
supervisory data: a dataset including first data and second data
first data: data constituted by images of spectrograms of friction sounds between sheets of paper and annotations indicating that a paper jam has occurred
second data: data constituted by images of spectrograms of friction sounds between sheets of paper and annotations indicating that a paper jam has not occurred The friction sounds between sheets of paper were friction sounds between sheets of paper produced when the following eight types of paper were fed to the paper feed device, and the friction sounds were collected for 30 msec from the start of paper feeding. The types of paper were fine quality paper 1, fine quality paper 2, fine quality paper 3, fine quality paper (light paper), glossy coated paper, pressure-sensitive paper base paper, tracing paper, and typewriter paper.

The supervisory data used in Working Example 1 does not include information pertaining to the type of the paper.

The outputs were "correct" (indicating a paper jam has not occurred) and "incorrect" (indicating a paper jam has occurred). Note that "correct" and "incorrect" may be indicated by binary values of 0 and 1.

(1-2) Machine Learning Model Used in Working Example 2

The machine learning models used in Working Example 2 were eight models, and for each of the eight types of paper, the supervisory data corresponding to the type of paper was selected from the supervisory data described above and used to train the model individually.

(2) Estimation Accuracy for Each of Types of Paper when a Single Trained Model (i.e., the First Trained Model) is Used Working Example 1

In Working Example 1, friction sounds between sheets of paper when the paper was fed from the holder were collected using the eight types of paper described above, and images of spectrograms of the friction sounds collected for 30 msec from the start of the paper feeding were input into a trained machine learning model trained under the conditions described above in (1-1). This operation was performed 10 times for each of the eight types of paper. The fed paper was stapled, and the number of times an estimation of "incorrect" was made (i.e., the number of times a correct estimation was made) out of the 10 attempts was counted. FIG. 12 illustrates the results thereof. FIG. 12 is a diagram illustrating the results of Working Example 1.

The estimation accuracy (%) indicated in FIG. 12 represents the number of times an estimation of "incorrect" was successfully made out of the 10 attempts. Of the eight types of paper that the scanner could handle, papers of different materials, thicknesses, and surface roughnesses were selected and used.

As illustrated in FIG. 12, in Working Example 1, the estimation accuracy varied depending on the type of paper, but there were also instances where the number of pieces of supervisory data varied depending on the type of paper, which is thought to be the cause of the variation in the estimation accuracy.

(3) Estimation Accuracy for Each Paper when Trained Models Corresponding to Each of Eight Types of Paper 10 (i.e., the First Trained Models) are Used Working Example 2

Figures 13, 14:
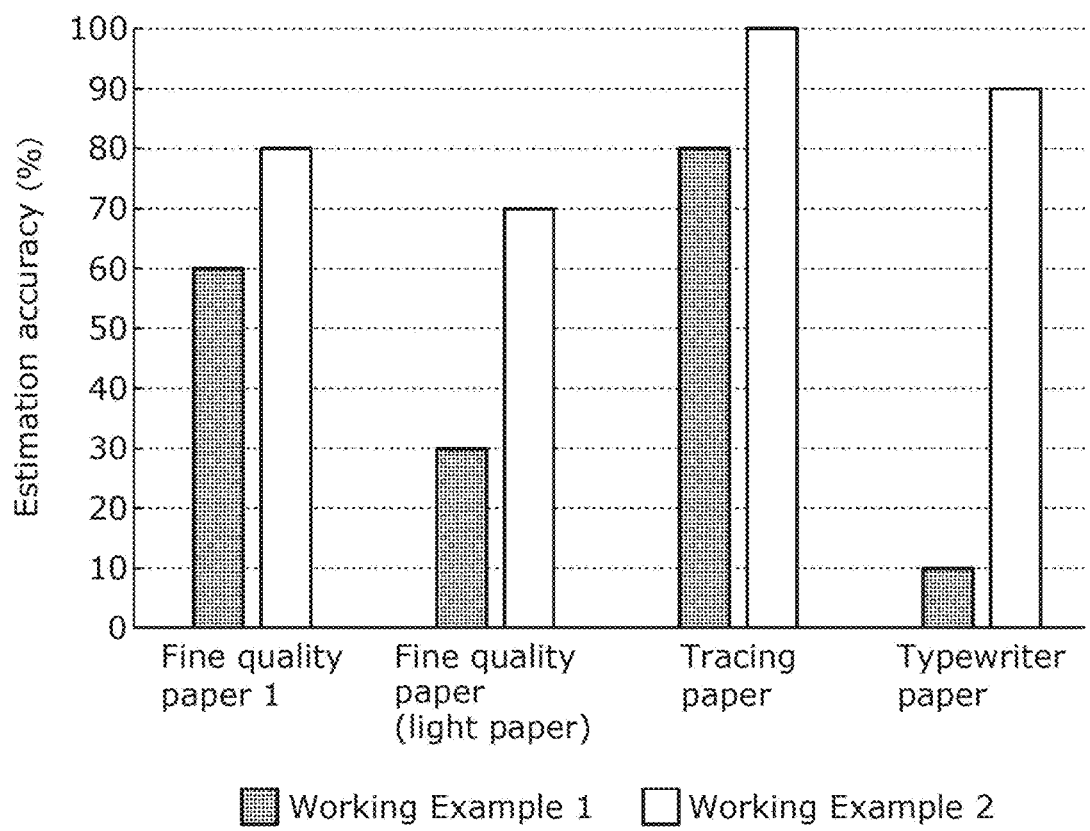
FIG. 13 is a diagram illustrating results of Working Example 2.
FIG. 14 is a diagram comparing the estimation accuracy of Working Example 1 and Working Example 2 for four types of paper in Working Example 2.

Working Example 2 was carried out in the same manner as Working Example 1, except that four of the eight types of paper described above were used, namely fine quality paper 1, fine quality paper (light paper), tracing paper, and typewriter paper, and that a trained model corresponding to each of these four types of paper was used. FIG. 13 illustrates the results thereof. FIG. 13 is a diagram illustrating the results of Working Example 2. FIG. 14 is a diagram comparing the estimation accuracy of Working Example 1 and Working Example 2 for the four types of paper in Working Example 2.

As illustrated in FIG. 13, the estimation accuracy was at least 70% for the four types of paper.

Additionally, as illustrated in FIG. 14, it was confirmed that switching among the four trained models corresponding to the four types of paper according to the type of the paper improves the estimation accuracy.

Results

Although the estimation accuracy varied in Working Example 1 due to bias in the supervisory data, it was confirmed that the presence or absence of an indication that a paper jam will occur can be estimated by using a machine learning model.

Additionally, based on the results of Working Example 1 and Working Example 2, it was confirmed that the presence or absence of an indication that a paper jam will occur can be estimated with good accuracy regardless of the type of the paper by switching the machine learning model to be used for each type of paper.

Other Embodiments

Although a paper jam indication estimation device and a paper jam indication estimation method according to one or more aspects of the present disclosure have been described thus far based on embodiments, the present disclosure is not intended to be limited to these embodiments. Variations on the present embodiment conceived by one skilled in the art, embodiments implemented by combining constituent elements from different other embodiments, and the like may be included in the scope of one or more aspects of the present disclosure as well, as long as they do not depart from the essential spirit of the present disclosure.

For example, some or all of the constituent elements included in the paper jam indication estimation device according to the foregoing embodiments may be implemented by a single integrated circuit through system LSI (Large-Scale Integration). For example, the paper jam indication estimation device may be constituted by a system LSI circuit including a sound collector, an estimator, and an outputter. Note that the system LSI circuit need not include a microphone.

"System LSI" refers to very-large-scale integration in which multiple constituent elements are integrated on a single chip, and specifically, refers to a computer system configured including a microprocessor, read-only memory (ROM), random access memory (RAM), and the like. A computer program is stored in the ROM. The system LSI circuit realizes the functions of the devices by the microprocessor operating in accordance with the computer program.

Note that although the term "system LSI" is used here, other names, such as IC, LSI, super LSI, ultra LSI, and so on may be used, depending on the level of integration. Further, the manner in which the circuit integration is achieved is not limited to LSIs, and it is also possible to use a dedicated circuit or a general purpose processor. It is also possible to employ a Field Programmable Gate Array (FPGA) which is programmable after the LSI circuit has been manufactured, or a reconfigurable processor in which the connections and settings of the circuit cells within the LSI circuit can be reconfigured.

Further, if other technologies that improve upon or are derived from semiconductor technology enable integration technology to replace LSI circuits, then naturally it is also possible to integrate the function blocks using that technology. Biotechnology applications are one such foreseeable example.

Additionally, rather than such a paper jam indication estimation device, one aspect of the present disclosure may be a paper jam indication estimation method that implements the characteristic constituent elements included in the device as steps. Additionally, aspects of the present disclosure may be realized as a computer program that causes a computer to execute the characteristic steps included in such a paper jam indication estimation method. Furthermore, aspects of the present disclosure may be realized as a computer-readable non-transitory recording medium in which such a computer program is recorded.

INDUSTRIAL APPLICABILITY

According to the present disclosure, an indication that a paper jam will occur, such as lifting of paper, for example, can be estimated with ease based on an output result obtained by inputting, into a trained model, information pertaining to friction sounds produced when paper is fed. The paper jam indication estimation device and the paper jam indication estimation method of the present disclosure can be applied in devices that feed paper to a variety of processing devices that process paper, and can therefore be applied in a variety of fields, such as household, industrial, and research applications.

The invention claimed is:

1. A paper jam indication estimation device that estimates an indication that a paper jam will occur in a paper feed device, the paper jam indication estimation device comprising:
   a microphone that collects a friction sound produced between sheets of paper when paper is fed into the paper feed device from a paper sheet holder holding a plurality of sheets of the paper;
   an estimation circuit that, based on an output result obtained by inputting information pertaining to the friction sound into a trained model that is a machine learning model which has been trained, estimates a presence or absence of an indication that a paper jam will occur in the paper feed device; and an output circuit that, when the estimation circuit estimates that the indication that a paper jam will occur is present, outputs, to the paper feed device, a signal that stops the paper from being fed into the paper feed device.

2. The paper jam indication estimation device according to claim 1,
wherein the information pertaining to the friction sound input into the trained model is an image of a spectrogram of the friction sound or an image of a frequency characteristic of the friction sound.

3. The paper jam indication estimation device according to claim 1,
wherein the friction sound is an inaudible sound produced by friction between the paper fed from the paper sheet holder and paper held in the paper sheet holder.

4. The paper jam indication estimation device according to claim 3,
wherein the inaudible sound is a sound at a frequency in an ultrasonic band.

5. The paper jam indication estimation device according to claim 1,
wherein supervisory data used to train the machine learning model includes:
first data constituted by the information pertaining to the friction sound and an annotation indicating a paper jam has occurred; and
second data constituted by the information pertaining to the friction sound and an annotation indicating a paper jam has not occurred.

6. The paper jam indication estimation device according to claim 1,
wherein the trained model includes a plurality of trained models, each of which is the trained model and each corresponding to a different one of a plurality of types of paper,
the paper jam indication estimation device further comprises an identification circuit that identifies a type of the paper fed into the paper feed device from the paper sheet holder, and
based on the type of the paper identified by the identification circuit, the estimation circuit inputs the information pertaining to the friction sound into the trained model corresponding to the type of the paper identified.

7. The paper jam indication estimation device according to claim 6,
wherein the identification circuit identifies the type of the paper based on data obtained by at least one of an image sensor, an ultrasonic sensor, an optical sensor, a weight sensor, or machine learning.

8. The paper jam indication estimation device according to claim 1,
wherein the machine learning model is a convolutional neural network model.

9. The paper jam indication estimation device according to claim 1,
wherein the paper feed device includes a separation roller that separates one sheet at a time of paper fed into the paper feed device from the paper sheet holder, and
the microphone is positioned at a side closer to the paper sheet holder than a position of the separation roller.

10. The paper jam indication estimation device according to claim 1,
wherein the microphone is positioned above the paper sheet holder.

11. A paper jam indication estimation method that estimates an indication that a paper jam will occur in a paper feed device, the paper jam indication estimation method comprising:
collecting a friction sound produced between sheets of paper when paper is fed into the paper feed device from a paper sheet holder holding a plurality of sheets of the paper;
estimating, based on an output result obtained by inputting information pertaining to the friction sound into a trained model that is a machine learning model which has been trained, a presence or absence of an indication that a paper jam will occur in the paper feed device; and
outputting, when the indication that a paper jam will occur is estimated to be present, a signal, to the paper feed device, that stops the paper from being fed into the paper feed device.

12. A non-transitory computer-readable recording medium having recorded thereon a program for causing a computer to execute a paper jam indication estimation method that estimates an indication that a paper jam will occur in a paper feed device, the paper jam indication estimation method comprising:
collecting a friction sound produced between sheets of paper when paper is fed into the paper feed device from a paper sheet holder holding a plurality of sheets of the paper;
estimating, based on an output result obtained by inputting information pertaining to the friction sound into a trained model that is a machine learning model which has been trained, a presence or absence of an indication that a paper jam will occur in the paper feed device; and
outputting, when the indication that a paper jam will occur is estimated to be present, a signal, to the paper feed device, that stops the paper from being fed into the paper feed device.

* * * * *